United States Patent
Tan et al.

(10) Patent No.: US 12,056,189 B2
(45) Date of Patent: Aug. 6, 2024

(54) NORM ADJUSTED PROXIMITY GRAPH FOR FAST INNER PRODUCT RETRIEVAL

(71) Applicant: Baidu USA, LLC, Sunnyvale, CA (US)

(72) Inventors: Shulong Tan, Santa Clara, CA (US); Zhaozhuo Xu, Houston, TX (US); Weijie Zhao, Sunnyvale, CA (US); Hongliang Fei, Sunnyvale, CA (US); Zhixin Zhou, Los Angeles, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 78 days.

(21) Appl. No.: 17/676,066

(22) Filed: Feb. 18, 2022

(65) Prior Publication Data

US 2023/0035337 A1 Feb. 2, 2023

Related U.S. Application Data

(60) Provisional application No. 63/221,380, filed on Jul. 13, 2021.

(51) Int. Cl.
   *G06F 16/901* (2019.01)
   *G06F 16/22* (2019.01)
   *G06F 17/16* (2006.01)

(52) U.S. Cl.
   CPC ...... *G06F 16/9024* (2019.01); *G06F 16/2237* (2019.01); *G06F 17/16* (2013.01)

(58) Field of Classification Search
   CPC ... G06F 16/9024; G06F 16/2237; G06F 17/16
   (Continued)

(56) References Cited

U.S. PATENT DOCUMENTS

| | | | | |
|---|---|---|---|---|
| 4,878,230 | A | * | 10/1989 | Murakami ............ H04N 19/94 375/240.22 |
| 5,966,471 | A | * | 10/1999 | Fisher .................... G06T 9/008 382/253 |

(Continued)

OTHER PUBLICATIONS

Keivani et al.,"Improved maximum inner product search with better theoretical guarantee using randomized partition trees," Machine Learning, 107:1069-1094, 2018. (26pgs).

(Continued)

*Primary Examiner* — Phong H Nguyen
(74) *Attorney, Agent, or Firm* — NORTH WEBER & BAUGH LLP

(57) ABSTRACT

Efficient inner product search is important for many data ranking services, such as recommendation and Information Retrieval. Efficient retrieval via inner product dramatically influences the performance of such data searching and retrieval systems. To resolve deficiencies of prior approaches, embodiments of a new index graph construction approach, referred to generally as Norm Adjusted Proximity Graph (NAPG), for approximate Maximum Inner Product Search (MIPS) are presented. With adjusting factors estimated on sampled data, NAPG embodiments select more meaningful data points to connect with when constructing a graph-based index for inner product search. Extensive experiments verify that the improved graph-based index pushes the state-of-the-art of inner product search forward greatly, in the trade-off between search efficiency and effectiveness.

20 Claims, 15 Drawing Sheets

(58) Field of Classification Search
USPC .................................. 707/741, 769, 797, 798
See application file for complete search history.

(56) References Cited

U.S. PATENT DOCUMENTS

| | | | |
|---|---|---|---|
| 11,023,477 B2* | 6/2021 | Fan | ........................ H04L 9/0894 |
| 2014/0244657 A1* | 8/2014 | Mizell | ................. G06F 16/2228 |
| | | | 707/743 |
| 2016/0357799 A1* | 12/2016 | Choi | .................... G06F 21/6227 |
| 2020/0125563 A1* | 4/2020 | Fan | ........................ H04L 9/0894 |

OTHER PUBLICATIONS

Y. Koren,"Collaborative filtering with temporal dynamics," In Proc. of the 15th ACM SIGKDD International Conference on Knowledge Discovery & Data Mining (KDD), 2009. (9 pgs).

Koren et al.,"Advances in collaborative filtering," In Recommender systems handbook, pp. 77-118. Springer, 2015. (42 pgs).

Koren et al.,"Matrix factorization techniques for recommender systems," Computer, (8):30-37, 2009. (8pgs).

Zhao et al.,"Song: approximate nearest neighbor search on GPU," In Proceedings of the 36th IEEE International Conference on Data Engineering (ICDE), 2020. (12pgs).

Zhou et al.,"Möbius transformation for fast inner product search on graph," In Advances in Neural Information Processing Systems (NeurIPS), 2019. (12pgs).

Gionis et al.,"Similarity search in high dimensions via hashing," In Proceedings of 25th International Conference on Very Large Data Bases (VLDB), 1999. (12pgs).

Guo et al.,"Quantization based fast inner product search," In Proceedings of the 19th International Conference on Artificial Intelligence and Statistics (AISTATS), 2016.(9pgs).

Hall et al.,"Fast and accurate maximum inner product recommendations on map-reduce," In Proceedings of the 24th International Conference on World Wide Web (WWW), 2015. (6pgs).

B. Hu et al.,"Convolutional neural network architectures for matching natural language sentences," In Advances in Neural Information Processing Systems (NIPS), 2014. (9pgs).

J. Hu et al.,"Collaborative filtering via additive ordinal regression," In Pro. of the 11th ACM International Conference on Web Search & DataMining (WSDM), 2018. (9pgs).

J. Hu et al.,"Collaborative multi-objective ranking," In Proceedings of the 27th ACM International Conference on Information and Knowledge Management (CIKM), 2018. (10pgs).

Y. Hu et al.,"Collaborative filtering for implicit feedback datasets," In Proceedings of the 8th IEEE International Conference on Data Mining (ICDM), 2008. (10pgs).

Indyk et al.,"Approximate nearest neighbors:Towards removing the curse of dimensionality," In Pro. of the13th Annual ACM Symposium on the Theory of Computing (STOC),1998.(20p).

Shrivastava et al.,"Asymmetric LSH (ALSH) for sublinear time maximum inner product search (MIPS), "arXiv preprint arXiv: 1405.5869, 2014. (19pgs).

Tan et al.,"On efficient retrieval of top similarity vectors," In Proceedings of the 2019 Conference on Empirical Methods in Natural Language Processing and the 9th International Joint Conference on Natural Language Processing (EMNLP-IJCNLP), 2019. (11pgs).

Tan et al.,"Fast item ranking under neural network based measures," In Proceedings of the 13th ACM International Conference on Web Search and Data Mining (WSDM), 2020. (9pgs).

Teflioudi et al.,"Exact and approximate maximum inner product search with lemp," ACM Transactions on Database Systems (TODS), 42(1):1-49, 2016. (51pgs).

Teflioudi et al.,"Lemp: Fast retrieval of large entries in a matrix product," In Proc. of the 2015 ACM SIGMOD International Con. on Management of Data (SIGMOD), 2015. (16pgs).

Weston et al.,"Large scale image annotation:learning to rank with joint word-image embeddings," Machine Learning, 81(1):21-35, 2010. (15pgs).

J. Xu et al.,"Deep learning for matching in search and recommendation," Found. Trends Inf. Retr., 14(2-3):102-288, 2020. (196pgs).

H. Xu et al.,"Deep matrix factorization models for recommender systems," In Pro. of the 26th International Joint Conference on Artificial Intelligence (IJCAI), 2017. (7pgs).

Yan et al.,"Norm-ranging LSH for maximum inner product search," In Advances in Neural Information Processing Systems (NeurIPS), 2018. (10pgs).

Yu et al.,"A greedy approach for budgeted maximum inner product search," In Advances in Neural Information Processing Systems (NIPS), 2017. (10pgs).

Yu et al.,"Large-scale multi-label learning with missing labels," In Proceedings of the 31th International Conference on Machine Learning (ICML), 2014. (9 pgs).

Boytsov et al.,"Off the beaten path: Let's replace term-based retrieval with k-nn search," arXiv preprint arXiv:1610.10001, 2016. (12pgs).

Chang et al.,"Pre-training tasks for embedding-based large-scale retrieval," arXiv preprint arXiv:2002.03932, 2020. (12pgs).

Covington et al.,"Deep neural networks for Youtube recommendations," In Proceedings of the 10th ACM Conference on Recommender Systems (RecSys), 2016. (8pgs).

Friedman et al.,"An algorithm for finding nearest neighbors," IEEE Transactions on Computers, 24:1000-1006, (22pgs).

Friedman et al.,"An algorithm for finding best matches in logarithmic expected time," ACM Transactions on Mathematical Software, 3:209-226, 1977. (18pgs).

Fu et al.,"Fast approximate nearest neighbor search with the navigating spreading-out graph," Proc. VLDB Endow., 12(5):461-474, 2019. (14pgs).

Abuzaid et al.,"To index or not to index: Optimizing exact maximum inner product search," arXiv preprint arXiv:1706.01449, 2019. (12pgs).

Ahmad et al.,"ReQA: An evaluation for end-to-end answer retrieval models," arXiv preprint arXiv:1907.04780, 2019. (10pgs).

F. Aurenhammer,"Voronoi diagrams—A survey of a fundamental geometric data structure," ACM Computing Surveys (CSUR), 23(3):345-405, 1991. (61pgs).

B. Frederickson,"Approximate nearest neighbours for recommender systems," [online], [Retrieved Oct. 4, 2023]. Retrieved from Internet <URL: https://www.benfrederickson.com/approximate-nearest-neighbours-forrecommender-systems/>, 2019. (5pgs).

B. Frederickson,"Fast python collaborative filtering for implicit feedback datasets," [online], [Retrieved Oct. 4, 2023]. Retrieved from Internet <URL: https://github.com/benfred/implicit>, 2019. (1page).

Bengio et al.,"A neural probabilistic language model," Journal of Machine Learning Research, 3:1137-1155, 2003. (20 pgs).

Lee et al.,"Reasoning in vector space: An exploratory study of question answering," arXiv preprint arXiv: 1511.06426, 2016. (12pgs).

Li et al.,"Fexipro: fast and exact inner product retrieval in recommender systems," In Pro. of the 2017 ACM International Conference on Management of Data (SIGMOD), 2017.(16p).

Malkov et al.,"Approximate nearest neighbor algorithm based on navigable small world graphs," Inf. Syst., 45:61-68, 2014. (10pgs).

Morozov et al.,"Non-metric similarity graphs for maximum inner product search," In Advances in Neural Information Processing Systems (NeurIPS), 2018. (10pgs).

Neyshabur et al.,"On symmetric and asymmetric LSHs for inner product search," arXiv preprint arXiv: 1410.5518, 2015. (11pgs).

Ram et al.,"Maximum inner-product search using cone trees," In Proc. of the 18th ACM SIGKDD International Conference on Knowledge Discovery & Data Mining (KDD), 2012. (10pgs).

Sarwar et al.,"Item-based collaborative filtering recommendation algorithms," In Proc. of the 10th International Conference on World WideWeb (WWW), 2001. (11pgs).

Seo et al.,"Real-time open-domain question answering with densesparse phrase index," arXiv preprint arXiv: 1906.05807, 2019. (12pgs).

\* cited by examiner

NORM ADJUSTED PROXIMITY GRAPH FOR FAST INNER PRODUCT RETRIEVAL

CROSS-REFERENCE TO RELATED APPLICATION(S)

This application claims the priority benefit under 35 USC § 119(e) to U.S. Prov. Pat. App. Ser. No. 63/221,380, filed on 13 Jul. 2021, entitled "NORM ADJUSTED PROXIMITY GRAPH FOR FAST INNER PRODUCT RETRIEVAL", and listing Shulong Tan, Zhaozhuo Xu, Weijie Zhao, Hongliang Fei, Zhixin Zhou, and Ping Li as inventors. The aforementioned patent document is incorporated by reference herein in its entirety.

BACKGROUND

A. Technical Field

The present disclosure relates generally to systems and methods for computer learning that can provide improved computer performance, features, and uses. More particularly, the present disclosure relates to systems and methods for retrieving relevant data.

B. Background

The last few years have seen dramatic increases in the prevalence of computing devices, in amounts and capabilities of data storage, and in data collection. As more computing devices are employed in ever-increasing ways and as costs for data storage continue to become less expensive, it becomes easier and cheaper to generate and/or collect data. The explosion of available data has numerous applications and can be quite valuable.

However, having vast amounts of data is itself not useful—it is fundamental that relevant data be returned when the user is searching. Here, the increase in amounts of data creates problems. Searching for relevant data in an extremely large dataset becomes harder and takes significantly more time. Furthermore, users not only expect good quality results to be returned but they also expect that the results be returned quickly—regardless of the size of the corpus of data that is being searched. Thus, researchers are continually striving to find better systems and methods for quickly and efficiently returning relevant information.

Efficient inner product search on embedding vectors is an important stage for online ranking services, such as recommendation and Information Retrieval. Recommendation algorithms, such as Matrix Factorization, usually produce latent vectors to represent users or items. The recommendation services are conducted by retrieving the most relevant item vectors given the user vector, where the relevance is often defined by inner product. Therefore, developing efficient recommender systems often requires solving the so-called Maximum Inner Product Search (MIPS) problem, which critically influences the performance of online Recommender Systems.

The inner product does not follow the triangle inequality of metric space, which makes approximate MIPS a distinct and challenging problem. Classical Approximate Nearest Neighbor (ANN) search methods have limited performance when extended to MIPS. The state-of-the-art graph-based ANN method, HNSW, may not work well in MIPS because its key part, the edge selection algorithm, is based on triangle inequality.

Accordingly, what is needed are better methods for identifying and returning relevant data.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 2A depicts the edge selection method for metric spaces, and FIG. 2B depicts failures when the same edge selection is extended to inner product.

DETAILED DESCRIPTION OF EMBODIMENTS

Figure 1:
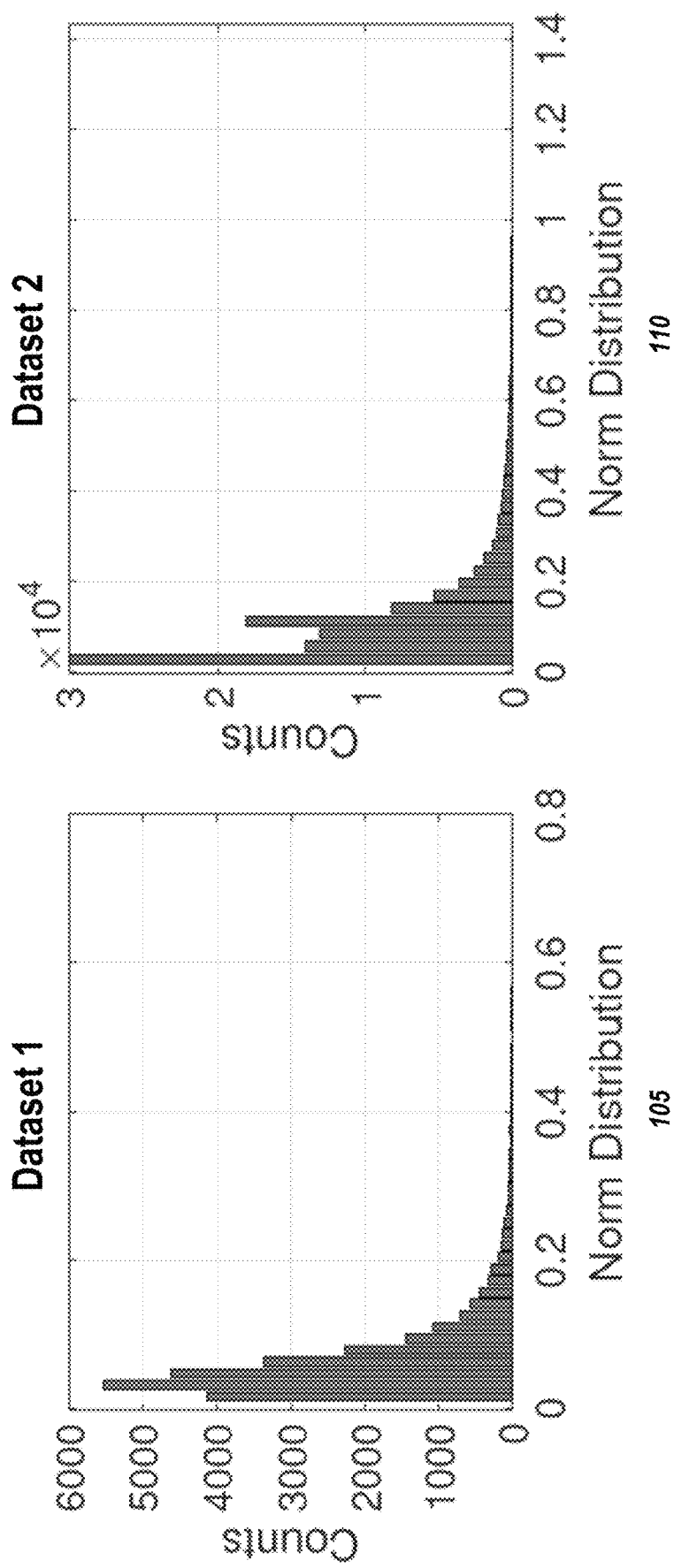
FIG. 1 depicts norm distribution analysis for two datasets. In these cases, most of the data points have much smaller norms than large norm data points.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded. A set may contain any number of elements, including the empty set.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

With the popularity of representation learning techniques, retrieval of similar vectors in the embedding space becomes a popular operation in various applications. For example, Collaborative Filtering (CF) projects users and items into a shared latent space, where a user or an item is represented as a vector of latent features. Thereafter a user's previous rating on an item is modeled as a matching function of their latent vectors. In online recommendation services, given a user vector, the system retrieves and returns item vectors with maximum matching scores. Similarly, for the Question Answering (QA) problem, questions, and documents (containing answers) may be embedded into a common semantic space. For each query question, the system may efficiently return answer candidates based on vector comparisons in the embedding space. And then, a fine trained ranking model may be used to further score these candidates. Recently, researchers found that with transformer-based models and finely designed pre-training, this vector-retrieval-based approach is even better than the classical term-based BM25 (Best Match 25, which is an information retrieval methodology that ranks a set of documents based upon query terms), for the answer candidate generation.

Inner product is a common and effective searching/ranking measure for similar vector retrieval, such as in recommendation models and retrieval-based Question Answering. Another popular measure—cosine similarity—may be considered as a special case of inner product on normalized vectors. Retrieval by inner product is often referred to as Maximum Inner Product Search (MIPS) in literature, which also has extensive applications in multi-label classification and Natural Language Processing (NLP). Since the retrieval space is usually very large, say millions or billions, linearly brute force ranking is too slow for online services. Therefore, accelerating the vector retrieval speed would benefit models' application in real-world systems. In practice, one may pursue approximate but sub-linear complexity ranking approaches with a proper tradeoff between searching efficiency and effectiveness. This efficient inner product ranking problem may be considered as approximate MIPS.

Approximate MIPS is considered a challenging problem since the inner product does not satisfy the triangle inequality. Traditional ANN search methods are designed for metric measures, such as $\ell_2$-distance or cosine similarity, thus their efficiency suffers when one directly extends them to MIPS. Some proposed tree-based methods to solve the approximate MIPS problem. More recently, a line of works proposed to transform MIPS to the traditional ANN search, by lifting the base data vectors and query vectors asymmetrically to higher dimensions. After the transformation, the well-developed ANN search methods may then be applied to solve the MIPS problem. There are other proposals designated for the MIPS task, such as quantization methods and Greedy-MIPS.

In particular, a graph-based approximate MIPS method, ip-NSW was proposed to solve MIPS by Hierarchical Navigable Small World (HNSW), which is the current popular ANN search algorithm. Compared to HNSW, ip-NSW simply replaces the metric measures with inner product. Generally, the framework of graph-based ANN search algorithm may be summarized as two steps: (1) Build a proximity graph where each vertex represents a base data vector. Each data vector connects with a few of its neighbors. (2) Given a query vector, perform a greedy search on the proximity graph by comparing the query vector with base data vectors under the searching measures (e.g., cosine similarity or inner product). Then, the most similar candidates are returned as outputs. A key point for these two-step methods is to construct a high-quality index graph, which provides a proper balance between the searching efficiency and effectiveness. To guarantee the searching efficiency, the degree of each vertex is usually restricted to a small number, such as 16. At the same time, it is hoped that the diversity of its neighbors is high, which may ensure the searching effectiveness.

For the graph-based MIPS method ip-NSW, although experiments show that it achieves significant improvement compared to previous MIPS methods, it was found that its algorithm, which is based on HNSW, is problematic. A key component of HNSW, the edge selection algorithm, which ensures the neighborhood diversity, is specially designed for metric spaces. The rough replacement, from metric measures to inner product, may make the edge selection method fail and lead to inefficient proximity graphs. To fix this issue, some proposed an edge selection algorithm specifically for inner product. However, such a proposed method Inner Product Delaunay Graph (IPDG) typically works advantageously on top-1 recalls.

To address this issue, in this patent document, new proximity graph-based MIPS methodology embodiments were designed, which may be referred to generally, for convenience, as Norm Adjusted Proximity Graph (NAPG) embodiments. In one or more embodiments, the $\ell_2$-norms of data points are adjusted when performing edge selection to make it work for inner product. One of the motivations of the approach is based on the long tail $\ell_2$-norm distributions in real datasets. It was observed by the inventors of the current patent document that most of the base vectors have much smaller $\ell_2$-norms, comparing those large norm data points, as examples shown in FIG. 1. FIG. 1 depicts norm distribution analysis for two datasets (Dataset 1 and Dataset 2). In these illustrated datasets, most of the data points have much smaller norms than large norm data points. When performing edge selection, such as by the way of ip-NSW, the data vector x in a small $\ell_2$-norm, with its neighbor candidates $\{p_i\}$, can only connect with one vertex p which has the largest inner product with it. Other vertices that also have large inner products with it are not connected since the inner product values between x and $\{p_i\}$ are totally not comparable with those among $\{p_i\}$. This leads to inefficient graph structures and seriously affects the MIPS performance. In one or more embodiments, by adjusting the $\ell_2$-norms of data points in small $\ell_2$-norms with a carefully selected factor $\alpha$, the data vector may be re-scaled to make $\alpha x^T p_i$ and $p_i^T p_j$ have the same expectation. In this way, the edge selection method works again for inner product and more meaningful (and diverse) edges may be constructed. The final index graph has improved connectivity and leads to performance improvements. The key adjusting factor $\alpha$ may be estimated based on small sampled data. Further, the factor may be refined into a finer granularity for each of the norm sub-ranges.

In experiments, embodiments of the introduced method, NAPG, were evaluated on six datasets. These datasets have various sizes and were extracted by different embedding models. As compared with competitive baselines, embodiments of NAPG show significant superiority across different testing cases. Some important contributions include, but are not limited to, the following:

A norm-adjusted factor is introduced for MIPS. In one or more embodiments, this factor bridges the gap between metric measures and inner product that enables an effective adaptation for graph-based MIPS methods.

Embodiments of an estimation method for the global adjusting factor are introduced, and the global adjusting factor may be refined into a finer granularity for each norm sub-range.

Extensive experiments were performed to evaluate embodiments of the estimation method. Results demonstrate the effective and efficient performance of the embodiments for the approximate MIPS problem.

B. MIPS Problem: Background and Existing Solutions

Formally, in the space $X \subset \mathbb{R}^d$, given a query/user latent vector set $S_u = \{q_1, \ldots, q_n\}$ and a base/item latent vector set $S_i = \{x_1, \ldots, x_m\}$, the ranking model defines a continuous symmetric similarity function, $f: X \times X \to \mathbb{R}$. And, the goal of optimal similar vector retrieval is to find:

$$p = \arg \max_{x \in S_i} f(x, q), \text{ for } q \in S_u. \tag{1}$$

Herein, the common case for the vector retrieval by inner product, i.e., $f(x, q) = x^T q$ is discussed. The problem in Equation (1) with respect to inner product is often referred to as Maximum Inner Product Search (MIPS), which is closely related with and distinctly different from conventional near neighbor search tasks. This is because the inner product does not satisfy the triangle inequality, unlike the $\ell_2$-distance or the cosine similarity.

Equation (1) may be re-formulated as a negative $\ell$ 2-distance problem or a cosine similarity problem:

$$p = \arg \max_{x \in S_i} -\|q - x\|^2 = \arg \max_{x \in S_i}(2x^T q - \|x\|^2), \tag{2}$$

$$p = \arg \max_{x \in S_i} \frac{x^T q}{\|x\|\|q\|} = \arg \max_{x \in S_i} \frac{x^T q}{\|x\|}. \tag{3}$$

It shall be noted that the $\ell_2$-norm of query q does not affect the ranking.

The search problem defined in (2) and (3) are equivalent to MIPS when all $\ell_2$-norms of $x \in S_i$ is a fixed constant. However, the $\ell_2$-norms of data points may be significantly different from each other in practice, such as examples in FIG. 1, which makes MIPS as a distinguishing task from traditional ANN search.

The brute-force approach to solving MIPS is computationally expensive. Some researchers try to speed up this task by novel indexes and pruning techniques. There are two categories among these techniques: (1) fast exact MIPS; and (2) fast approximate MIPS, which are elaborated in detail in the following subsections.

In practice, an aim is to retrieve not only the most relevant vector but also the top-k ones. Meanwhile, another aim is to retrieve these vectors as soon as possible due to the latency restriction. Thus, it becomes:

Let $T_k \subset S_i$ be a set that:

$|T_k|=k, \forall x \in T_k, \forall x' \in S_i \setminus T_k$ $f(x,q) \geq f(x',q)$ In time t, an aim is to find k vector candidates $C_k$ that:

maximize $|C_k \cap T_k|$, subject to $C_k \subset S_i$.

$T_k$ represents the top-k suitable vectors. $C_k$ is the vector candidates that a method returned within limited time t.

1. Existing Solutions for Exact MIPS

Efficient exact MIPS mainly utilizes matrix computations and pruning techniques. LEMP (LEMP stems from finding Large Entries in a Matrix Product) transforms the MIPS problem into a number of smaller cosine similarity search problems. This transformation allows LEMP to prune large parts of the search space quickly and to select suitable search algorithms for each of the remaining problems individually. Some proposed FEXIPRO (Fast and EXact Inner PROduct retrieval) based sequential scan. FEXIPRO applies a singular value decomposition (SVD) transformation to the base vector matrix, after which the first several dimensions capture a large percentage of the inner products. This will prune base vectors by computing their partial inner products with the query vector. Others showed that the fastest of today's indexes do not always outperform blocked matrix multiply, proposed MAXIMUS, a simple hardware-optimized indexing scheme that leverages linear algebra kernels to gain hardware efficiency while also pruning computation, and designed OPTIMUS, a system that allegedly can efficiently choose between using an index and blocked matrix multiplication. Although these methods appear to be much more efficient than the brute-force scan, they are only suitable for the moderate data size and data dimension.

2. Existing Solutions for Approximate MIPS

As the inner product is a non-metric similarity measure that does not comply with the triangle inequality, it makes many well-studied ANN search techniques ineffective or inefficient. To overcome the variation in $\ell_2$-norms, previous works reduced MIPS to an ANN search problem in metric space by pre-processing the base data and queries asymmetrically. Recently, researchers found that the method above has limitations in performance due to the long tail distribution of data norms. Based on these observations, some designed an approach called normal-range locality sensitive hashing (Range-LHS). In this approach, the dataset was first partitioned into small subsets according to the $\ell_2$-norm rank and then transformations were applied in each sub-dataset by normalizing data using a local maximum $\ell_2$-norm. Similarly, others also partitioned data by the norm distribution, by proposing an alternative query transformation to avoid the distortion error.

A motivation behind embodiments herein is also the observation of the long tail distribution in data norms, but embodiments herein solve it by a different methodology—graph-based index.

Non-reducing MIPS methods have also been proposed and evaluated in MIPS benchmarks. Some proposed a tree-based approach for MIPS. They did not construct a special tree for MIPS. Instead, they introduced a new bound for the inner product in the searching phases. This bound may be a key fact of tree-based methods. It determines the conditions whether the sub-trees can be ignored, for speeding up the searching process. Recently, randomized partition tree was also exploited for the MIPS problem. Others proposed a MIPS method based on Product Quantization (PQ) and extended the application of the PQ technique. Yet others used an upper bound of the inner product as the approximation of MIPS and designed a greedy search algorithm to find this approximation, called Greedy-MIPS. Similarly, some provided improved bounds on the inner product under the random projection that matches the optimal bounds on the Euclidean distance.

As graph-based indexing approaches have demonstrated their superior efficiency and effectiveness in ANN search with cosine similarity or $\ell_2$-distance, the idea of searching by proximity graph has been extended to other similarity measures, such as inner product. Some provided the theoretical basis for conducting MIPS by proximity graph: if the constructed graph contains the Delaunay graph with respect to the inner product, then the greedy search on the graph gives the exact true answer for MIPS. In the implementation, ip-NSW utilizes an algorithm to construct a Hierarchical Navigable Small World (HNSW) graph for indexing. To adapt the MIPS problem, ip-NSW replaced metric measures in HNSW by the inner product. To construct better Delaunay graphs with respect to the inner product, others propose a new edge selection algorithm, Inner Product Delaunay Graph (IPDG). IPDG works surprisingly well on top-1 recall but it is not suitable for top-k (e.g., k=10 or k=100) scenarios.

C. Proximity Graph-based Searching

In this section, it is explained why HNSW and ip-NSW are problematic for solving MIPS.

1. Search on Approximate Delaunay Graph

HNSW has two main components: (1) proximity graph construction (Methodology 1) and (2) greedy search on graph (Methodology 2).

| Methodology 1: HNSW/ip-NSW Graph Construction |
| --- |
| 1. Input: Latent vector set S, the maximum vertex degree M, the priority queue size k for searching neighbors and the similarity measure $f$. // SoG = Search on Graph |
| 2. Initialize graph G ← ∅ |
| 3. for each x in S do |
| 4.    Greedy search k vertices $\{p_i\}$ on G by SoG (x, G, k, f) that have the largest values with x in $f(x, p_i)$, place them in descending order. |
| 5.    C ← ∅ |
| 6.    for i ← 1 to k do |
| 7.       flag ← True |
| 8.       for all p in C do |
| 9.          if $f(x, p_i) < f(p, p_i)$ then |
| 10.            flag ← False |
| 11.            break |
| 12.       if flag = True then |
| 13.          C ← C ∪ $\{p_i\}$ |
| 14.          add edge $\{x, p_i\}$ to G |
| 15.       if |C| = M then |
| 16.          break |
| 17. Output: index graph G |

| Methodology 2: Greedy Search on Graph SoG (q, G, k, f) |
| --- |
| 1. Input: the query element q, the similarity graph G = (V, E), the priority queue size k, and the similarity measure $f$. |
| 2. Randomly choose a vertex p ∈ V as the starting point and initialize the set A ← {p}. |
| 3. Set p as checked and the rest of the vertices as unchecked. |
| 4. while A does not converge do |
| 5.    Add unchecked neighbors of vertices in A to A. |
| 6.    Set vertices in A as checked. |
| 7.    A ← top-k elements of v ∈ A in order of $f(v, q)$. |
| 8. Output: A. |

The graph of HNSW is built in a greedy manner. As represented in Methodology 1, for each new coming in data point x, it first retrieves a neighbor candidate set $\{p_i\}$ by the greedy search algorithm on the current graph. Then, x is inserted into the graph G by connecting to its M finely selected neighbors. It shall be noted that the graph G may be initialized as an empty graph in one or more embodiments. Then, the first data point is inserted as an isolated node. When inserting the second node, the first edge is constructed and so on. After the graph construction, given a query point, Methodology 2 performs a greedy search on graph and returns the items which maximize the similarity measure $f$.

In one or more embodiments, in order to find the exact nearest neighbor by greedy search, the graph contains a Delaunay graph as a subgraph. Such an implementation may be extended to the MIPS problem. Although the Delaunay Graph has demonstrated its potential in similarity search, the direct construction of the Delaunay Graph in large scale and high dimensional datasets tends to be unfeasible due to the exponentially growing number of edges in high dimension. To remedy this issue, practical methods may be used to approximate Delaunay Graphs, such as shown in Methodology 1 (HNSW/ip-NSW).

2. Edge Selection

Figure 2A:
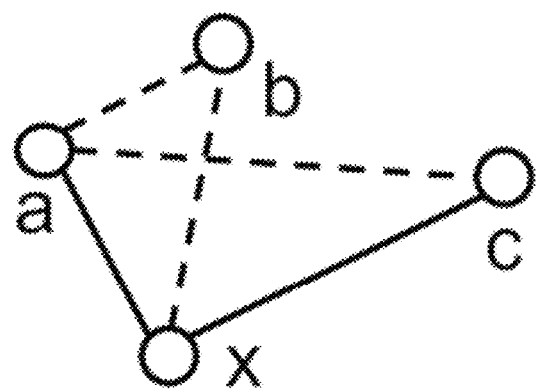
FIGS. 2A & 2B depict illustrations of edge selection.

To achieve an efficient and effective approximate Delaunay graph, a key fact of the graph construction is the neighbor/edge selection (shown in Methodology 1: Line 5-16), which makes sure that the limited selected neighbors are representative (e.g., diverse in directions for the metric cases). This may largely benefit the searching trade-off between efficiency and effectiveness. For example, a schematic illustration for the metric measure is represented in FIG. 2A. Here the similarity measure is negative Euclidean distance. It is assumed that the current inserting point is x and the returned candidate neighbors are $\{a, b, c\}$. HNSW may first add x's nearest neighbor a to C and connect x to a. Then, for other vertices in the neighbor set, HNSW selects c instead of b to connect with for $f(x,c) > f(a,c)$ and $f(x,b) < f(a,b)$–b is more like a while c is more diverse from a in directions. In this way, the navigation of greedy search, especially in the first steps, may be more efficient.

Figure 2B:
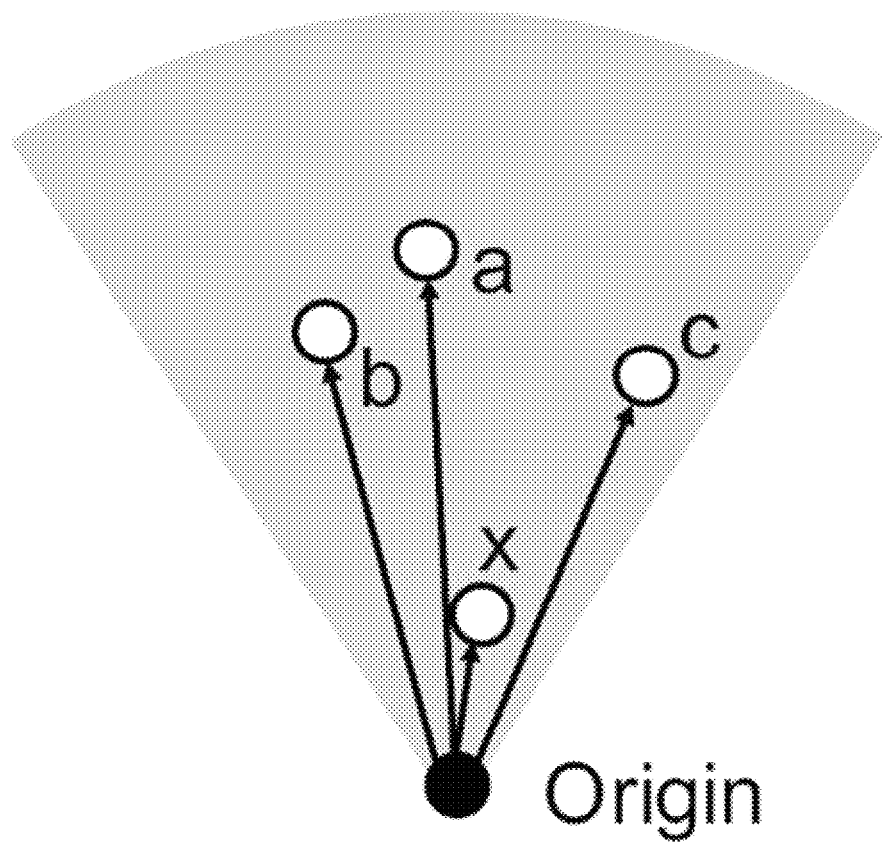

As an heir of HNSW, ip-NSW shares Methodology 1 and Methodology 2. A difference is in the similarity measure. HNSW is designed for metric measures, such as cosine similarity or negative Euclidean distance, while ip-NSW sets $f(x,q) = x^T q$. As noted, inner product poses challenges to the edge selection method of Methodology 1 since the inner product does not follow the triangle inequality of metric space. As illustrated by the example shown in FIG. 2B, the small norm data point x retrieves a set of nodes with larger inner product values with it, say $\{a, b, c\}$. As previously analyzed, $\{a, b, c\}$ are usually nodes with larger norms in the same Voronoi cell with x. In FIG. 2B, the gray area represents the corresponding Voronoi cell. The $\ell_2$-norms $\{a, b, c\}$ are much larger than that of x. For this case, the edge selection method in Methodology 1 may need to be re-checked. Due to the inner product values between x and $\{a, b, c\}$ are much smaller than those among $\{a, b, c\}$, x is not connected to either b or c for $x^T b \ll a^T b$ and $x^T c \ll a^T c$ too. Therefore x may only connect to the node, a, which has the largest inner product $x^T a$. Eventually, most of the data points do not have (incoming) edges and do not play roles in query searching. Thus, the edge selection method in Methodology 1 leads to an inefficient index graph and largely limits the retrieval performance, especially for top-k results, where $k \gg 1$, e.g., 100.

Norm distributions of experimental datasets were analyzed, and it was found that the case shown in FIG. 2B is very common. Analysis results of two datasets are shown in FIG. 1. Due to the long-tail $\ell_2$-norm distribution, only a few data points have large $\ell_2$-norms while most of the others have relatively much smaller norms. In the next section, embodiments of a norm-adjusted edge selection methodology—more suitable for constructing graph indices for inner product—are presented.

D. Norm Adjusted Proximity Graph Embodiments

In this section, embodiments of the graph-based MIPS methodology, which may be referred to for convenience as Norm Adjusted Proximity Graph (NAPG) embodiments, are described. Referring back to the example shown in FIG. 2B, the norm of x is much smaller than its neighbor candidates—a, b, and c which makes $x^T p_i$ always smaller than $p^T p_i$ in Methodology 1, Line 9. This leads to an inefficient index graph and hurts the searching performance. The impacts may become more apparent in real applications that consider top-10 or top-100 MIPS results.

To address this limitation, embodiments of a new methodology to construct proper graphs for MIPS were developed and are presented herein. The basic idea is to make the edge selection work again—representative neighbors may be selected for those nodes with small norms (the vast majority). Specifically, in one or more embodiments, the norm of the inserting node x may be adjusted by an adjusting factor α, and the inequality in Methodology 1, Line 9 may be replaced by:

$$\alpha x^T p_i < p^T p_i. \quad (4)$$

In one or more embodiments, the adjusting factor may be set to $\alpha > 1$, and the scales of $\alpha x^T p_i$ and $p^T p_i$ may be made to be comparable. In this way, not only the node has the largest inner product with x (i.e., a in FIG. 2B), but also other candidates may be selected as x's outgoing neighbors. A key question that remains is how to choose proper values for the adjusting factor α. In the next sections, embodiments of a flexible method to estimate a based on sampled data are presented.

1. Adjusting Factor Estimation Embodiments

A function of the factor α is to adjust two sides of the inequality (4) into comparable scales. In one or more embodiments, for each index data point x and its top-n MIPS results $\{p_i\}$ (corresponding to the neighbor candidate set), it is desired that the expectation of adjusted x's inner product values with $\{p_i\}$ and inner product values among data points $\{p_i\}$ are equal:

$$\mathbb{E}_{[\alpha x^T p_i]} = \mathbb{E}_{[p_i^T p_j]}. \quad (5)$$

Since α is a constant, Equation (5) may be rewritten into:

$$\alpha = \mathbb{E}_{[p_i^T p_j]} / \mathbb{E}_{[x^T p_i]}. \quad (6)$$

Figure 3:
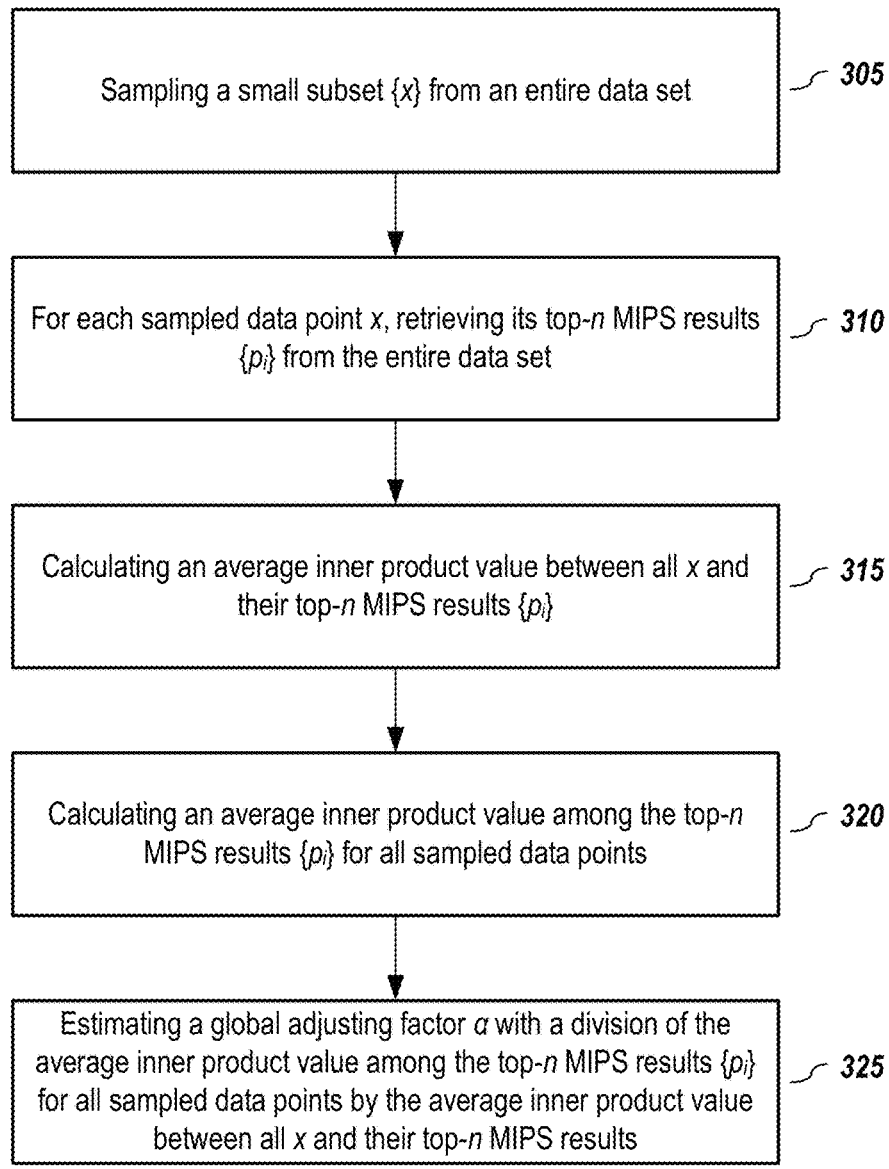
FIG. 3 depicts a process to estimate a global adjusting factor, according to embodiments of the present disclosure.

The expectations $\mathbb{E}[p_i^T p_j]$ and $\mathbb{E}[x^T p_i]$ may be estimated by averaging values over a sample. Specifically, in one or more embodiments, the global adjusting factor α may be estimated using steps as shown in FIG. 3:

(1) Sample (305) a small subset $\{x\}$ from an entire indexing data set;
(2) For each sampled data point x, retrieve (310) its top-n (e.g., n=100) MIPS results $\{p_i\}$ from the entire data set;
(3) Calculate (315) an average inner product value, Avg $(x^T p_i)$, between all x and their top-n MIPS results $\{p_i\}$;
(4) Calculate (320) the average inner product values among all x's $\{p_i\}$, Avg$(p_i^T p_j)$; and
(5) Estimate (325) a global adjusting factor α using a division of Avg$(p_i^T p_j)$ by Avg$(x^T p_i)$, e.g., $\alpha = \text{Avg}(p_i^T p_j)/\text{Avg}(x^T p_i)$.

After the global adjusting factor α is estimated, the inequality in Methodology 1, Line 9 may be replaced with inequality (4) to construct a better approximate Delaunay graph.

2. Norm Range based Adjusting Factors Embodiments

It should be noted that the global adjusting factor α may not be optimal since the inserting data points have varying norms. A more fine-grained solution is to estimate a local adjusting factor for data points in each norm range. This norm-range idea may be considered to be similar to ones that reduce the MIPS problem to traditional ANN search problems by pre-processing data in each norm range. Here, however, the norm-range is explored in a different way, for norm-range-based local adjusting factors.

Figure 4:
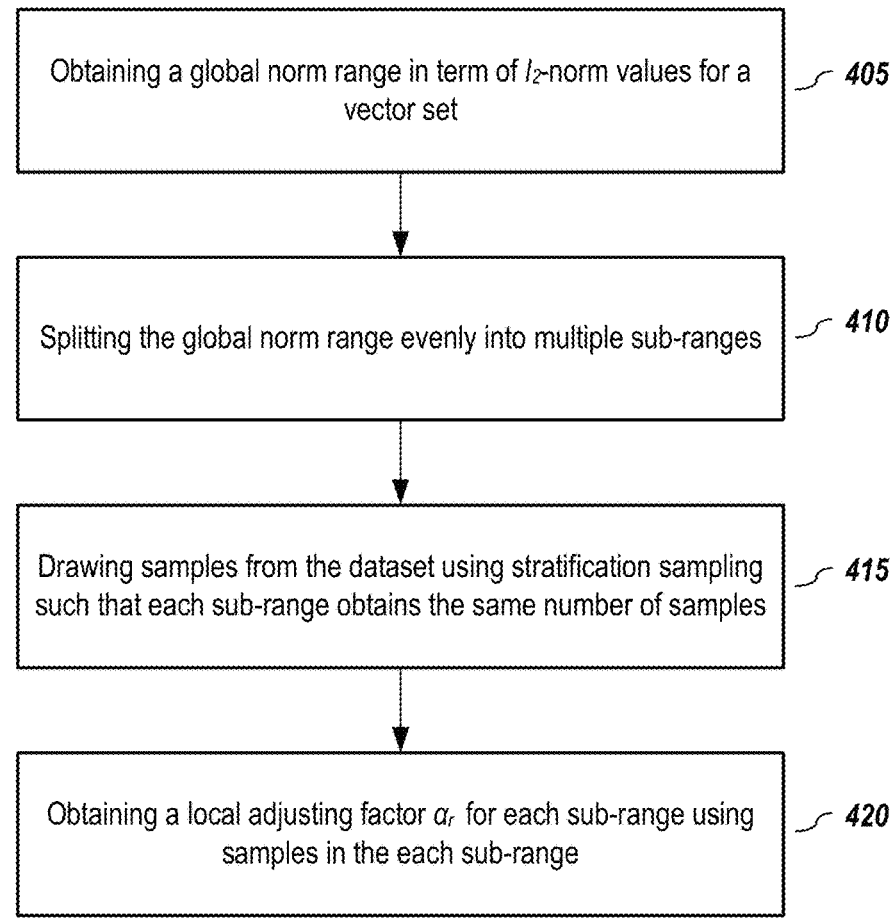
FIG. 4 depicts a process to estimate local adjusting factors, according to embodiments of the present disclosure.

FIG. 4 depicts a process to estimate local adjusting factors, according to embodiments of the present disclosure. To get local adjusting factors, in one or more embodiments, data points are first partitioned by their $\ell_2$-norms. Given a vector set, a global norm range in terms of $\ell_2$-norm values is obtained (405) for the set. The global norm range (from the smallest to the largest) is split (410) into multiple (N) sub-ranges evenly by $\ell_2$-norm values. Each sub-range may be considered as a stratum. Samples may be drawn (415) from the dataset using stratification sampling such that each sub-range obtains the same number of samples. For each sub-range, a local adjusting factor $\alpha_r$ is obtained (420) in the sub-range based on Equation (6) using the samples in each sub-range (as shown in lines 7-9 of Methodology 3). In the graph construction, the corresponding $\alpha_r$ of the current inserting point may be located based on its norm value in one or more embodiments. Then, $\alpha_r$ may be employed as a factor in edge selection.

3. Implementation Embodiments

At the algorithmic level, in one or more embodiments, NAPG may share the greedy search method shown in Methodology 2 but exploit a unique graph construction methodology (i.e., Methodology 4). Before constructing an NAPG, the adjusting factors for each norm range may first be estimated. The norm-range-based adjusting factor estimation method embodiment is represented in Methodology 3.

Based on the estimated factors, the NAPG construction may be implemented as shown in Methodology 4 in one or more embodiments. It shall be noted that one of the main differences between HNSW/ip-NSW and NAPG lies in the edge selection step. With the norm-range-based adjusting factors, an NAPG may construct a more effective and efficient index graph for MIPS than ip-NSW. As shown in experimental results in Section E, benefiting from the proper index graph, tested NAPG embodiments work much better than ip-NSW.

---

Methodology 4 : NAPG Construction Embodiment

5. Get the adjusting factor $\alpha_r$ for the range x belongs to.
6. C ← ∅.
7. for i ← 1 to k do
8.    flag ← True
9.    for all p in C do
10.       if $\alpha_r x^T p_i < p_i^T p$ then
11.          flag ← False
12.          break
13.    if flag = True then
14.       C ← C ∪ {$p_i$}
15.       add edge {x, $p_i$} to G
16.    if |C|= M then
17.       break
18. Output: index Graph, G

---

Figure 5:
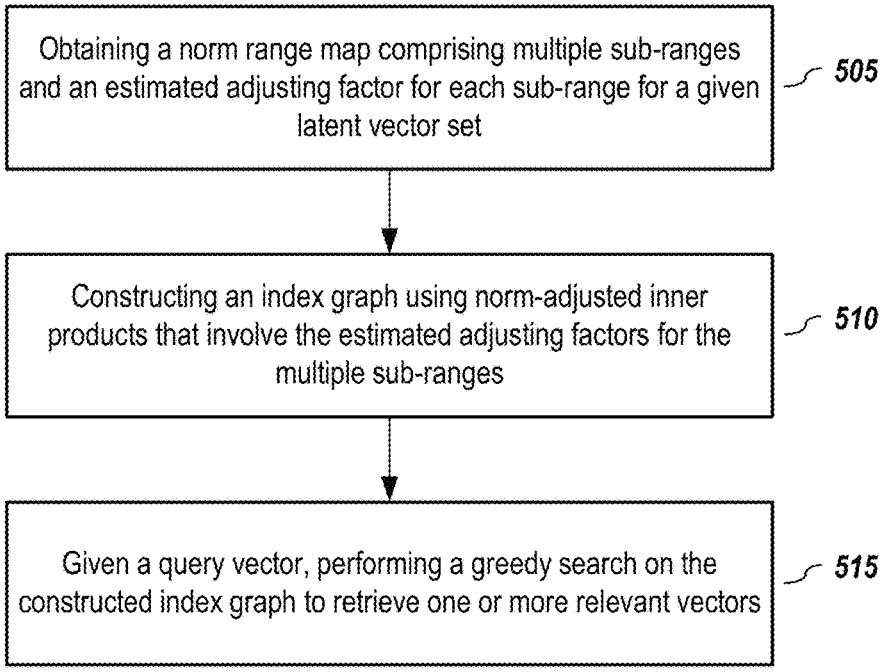
FIG. 5 depicts a process for NAPG construction, according to embodiments of the present disclosure.

FIG. 5 depicts a process for NAPG construction, according to embodiments of the present disclosure. Given a latent vector set, a norm range map R comprising multiple sub-ranges and an estimated adjusting factor for each sub-range are obtained (505) using a process shown in Methodology 3. An index graph G is constructed (510) using norm-adjusted inner products that involve the estimated adjusting factors for the multiple sub-ranges. In one or more embodiments, the index graph G may be generated with involvement of at least processes shown in Methodology 4. Once the index graph G is generated, a greedy search given a query vector is performed (515) on the constructed index graph G to retrieve one or more relevant vectors. In one or more embodiments, the retrieved one or more relevant vectors are ranked in terms of inner products between each relevant vector and the query vector.

---

Methodology 3: Norm Range Based Adjusting Factor Estimation Embodiment

1. Input: Item latent vector set S, the number of norm ranges N, the sample size Z for each range, and the amount n of return results for each sample data.
2. Partition S into N sub-ranges {$S_1, S_2, \ldots, S_N$} such that $S_r$ holds base vectors whose $\ell_2$-norm ranked in the sub-range $\left[\frac{(r-1)|S|}{N}, \frac{r|S|}{N}\right]$ and record the partition by the map R.
3. for r ← 1 to N do
4.    Randomly sample Z data points {x} from $S_r$.
5.    for all x in {x} do
6.       Retrieve n data points {$p_i$} from S which have the largest inner product values with x.
7.    Calculate the average of inner product values between all x and their {$p_i$} $\text{Avg}(x^T p_i)$.
8.    Calculate the average of inner product values among all x's {$p_i$}, $\text{Avg}(p_i^T p_j)$
9.    Get the estimated $\alpha_r \leftarrow \frac{\text{Avg}(p_i^T p_j)}{\text{Avg}(x^T p_i)}$
10. Output: The norm range map R and the estimated adjusting factors for each sub-range {$\alpha_1, \alpha_2, \ldots \alpha_N$}.

---

Methodology 4 : NAPG Construction Embodiment

1. Input: Item latent vector set S, the norm range map R, the estimated adjusting factors for each sub-range {$\alpha_1, \alpha_2, \ldots, \alpha_N$}, the maximum vertex degree M, and the priority queue size k.
2. Initialize graph G ← ∅
3. for all x in S do
4.    Greedy search k vertices {$p_i$} on G by SoG(x, G, k, f) that have the largest inner product values with x, place them in descending order.

---

Figure 6:
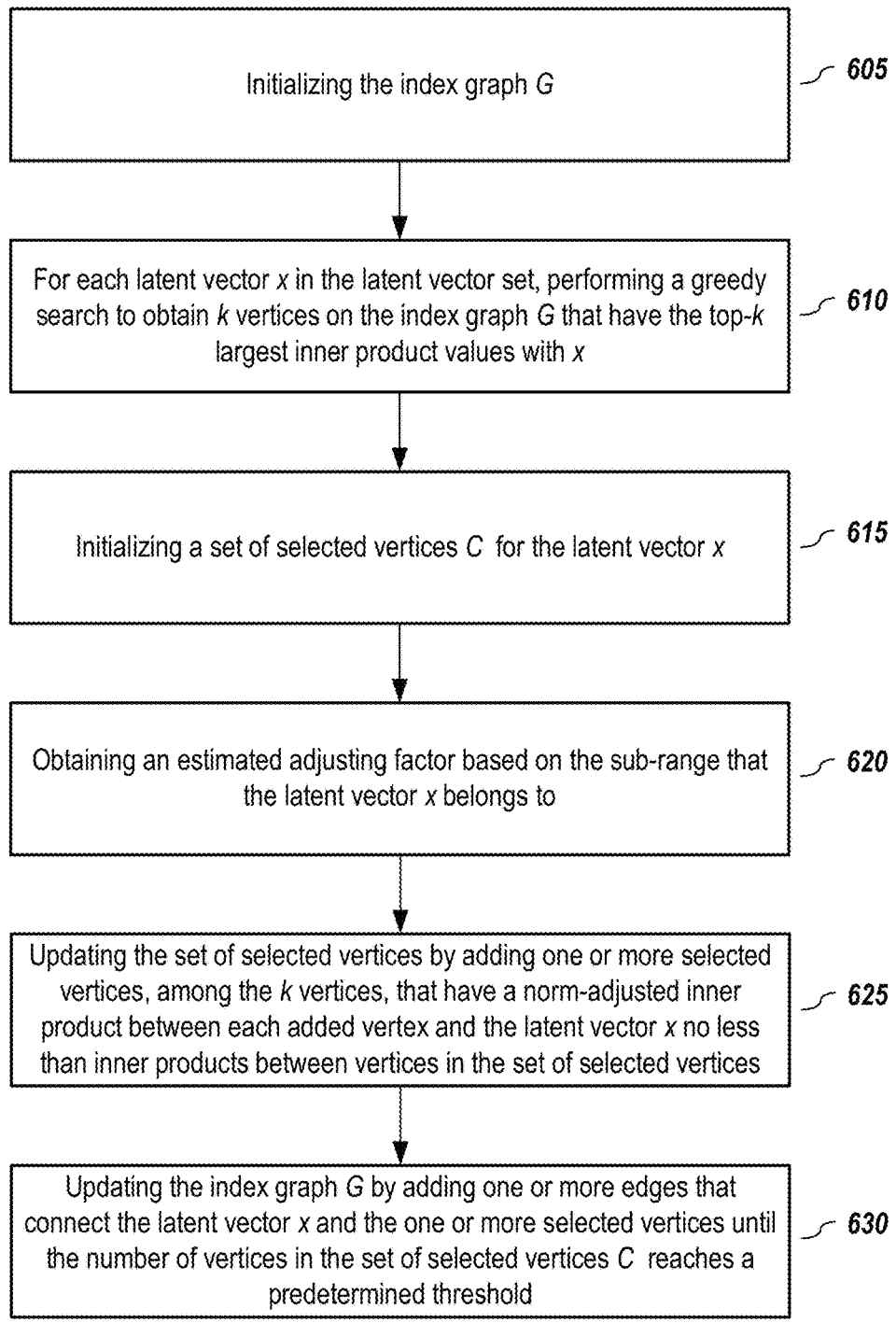
FIG. 6 depicts a process for index graph generation, according to embodiments of the present disclosure.
Figure 7A:
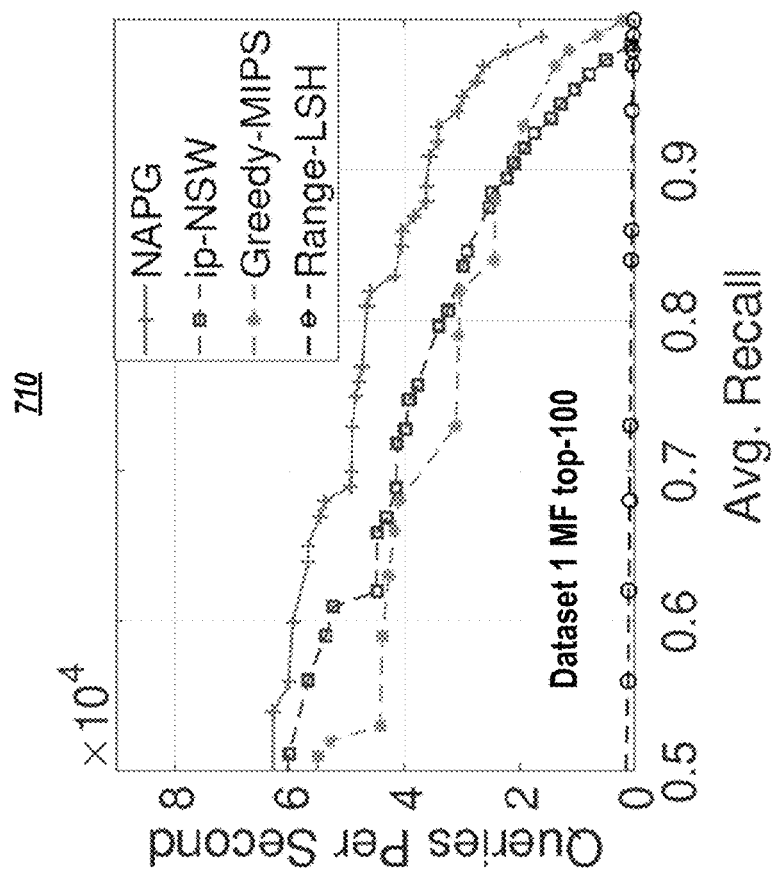
FIGS. 7A-F graphically depict comparisons via Recall vs. Time for all methods, based on top-10 and top-100 ground truth labels, according to embodiments of the present disclosure.
Figure 7A:
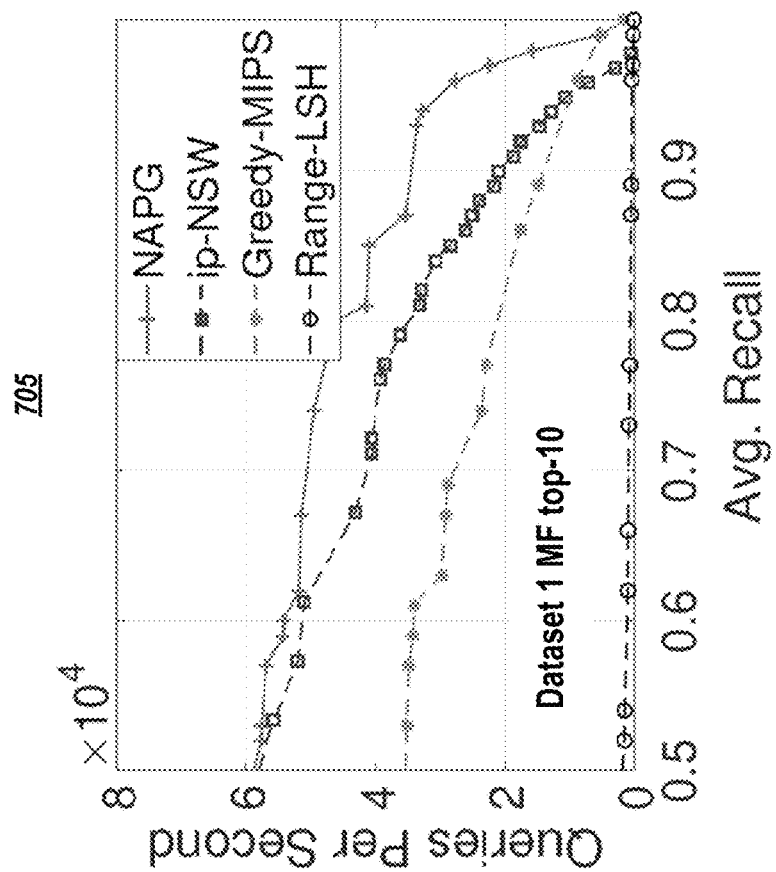
Figure 7B:
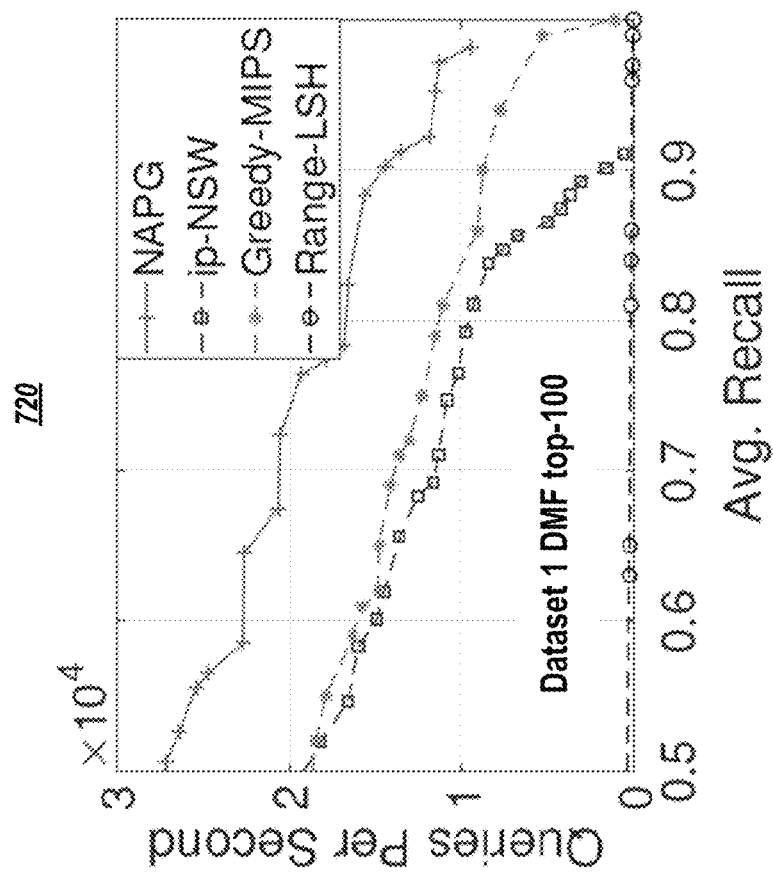
Figure 7B:
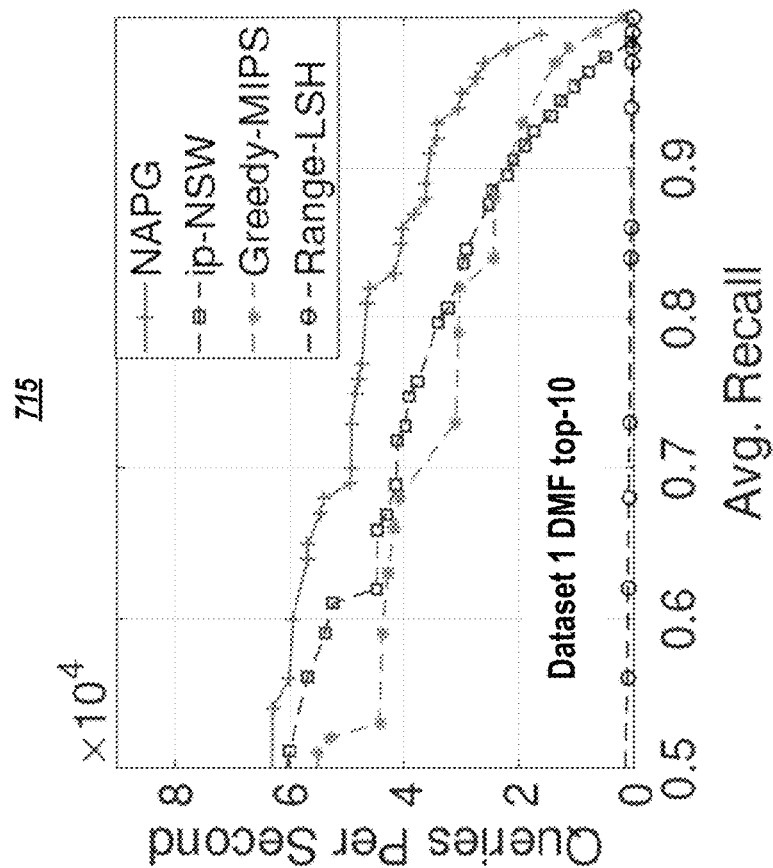
Figure 7C:
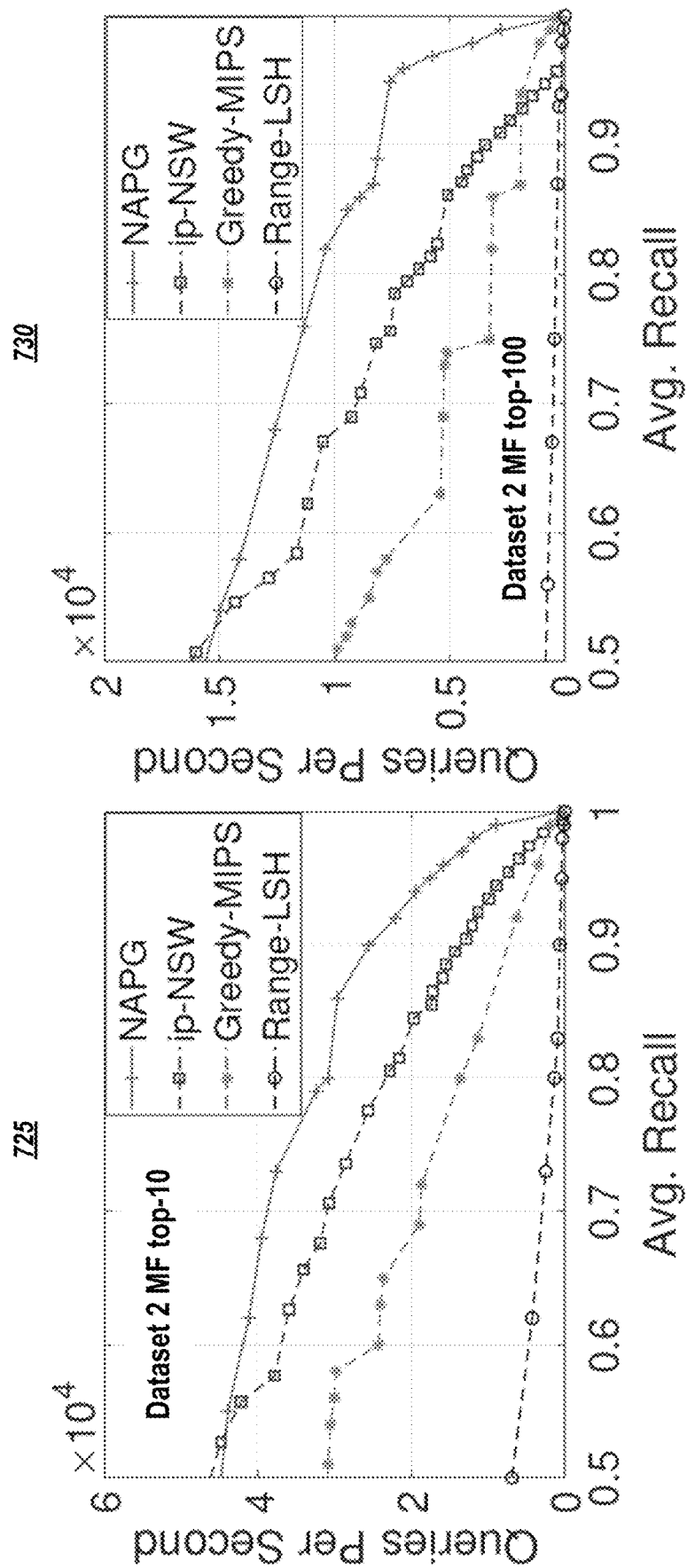
Figure 7D:
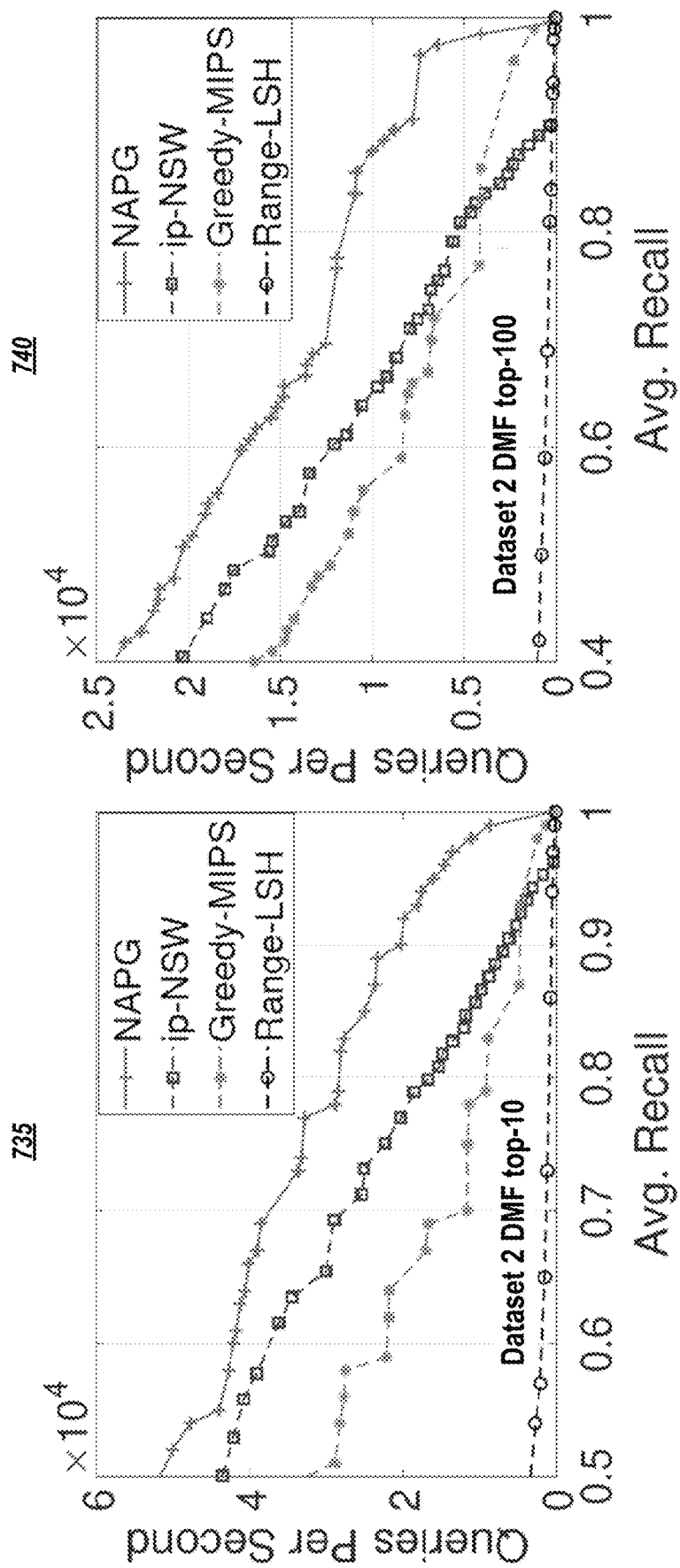
Figure 7E:
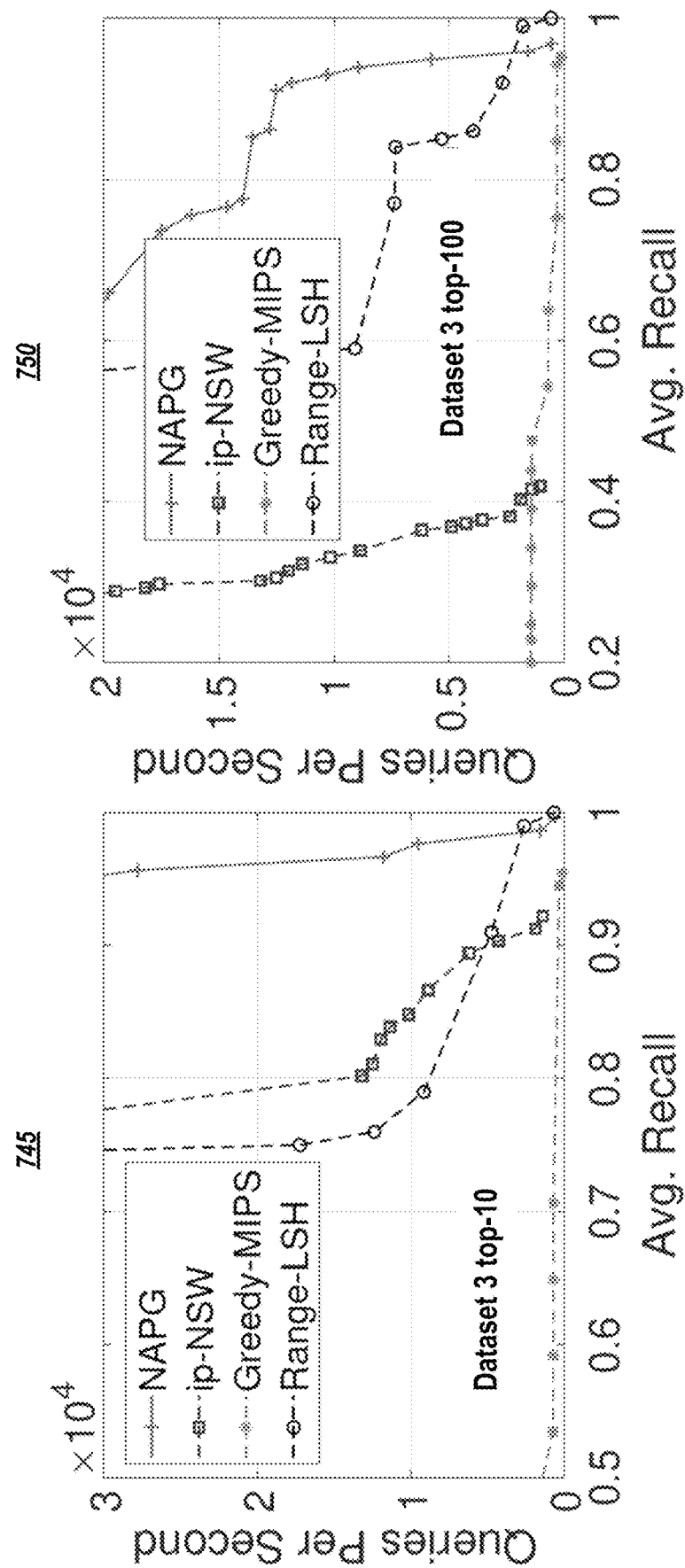
Figure 7F:
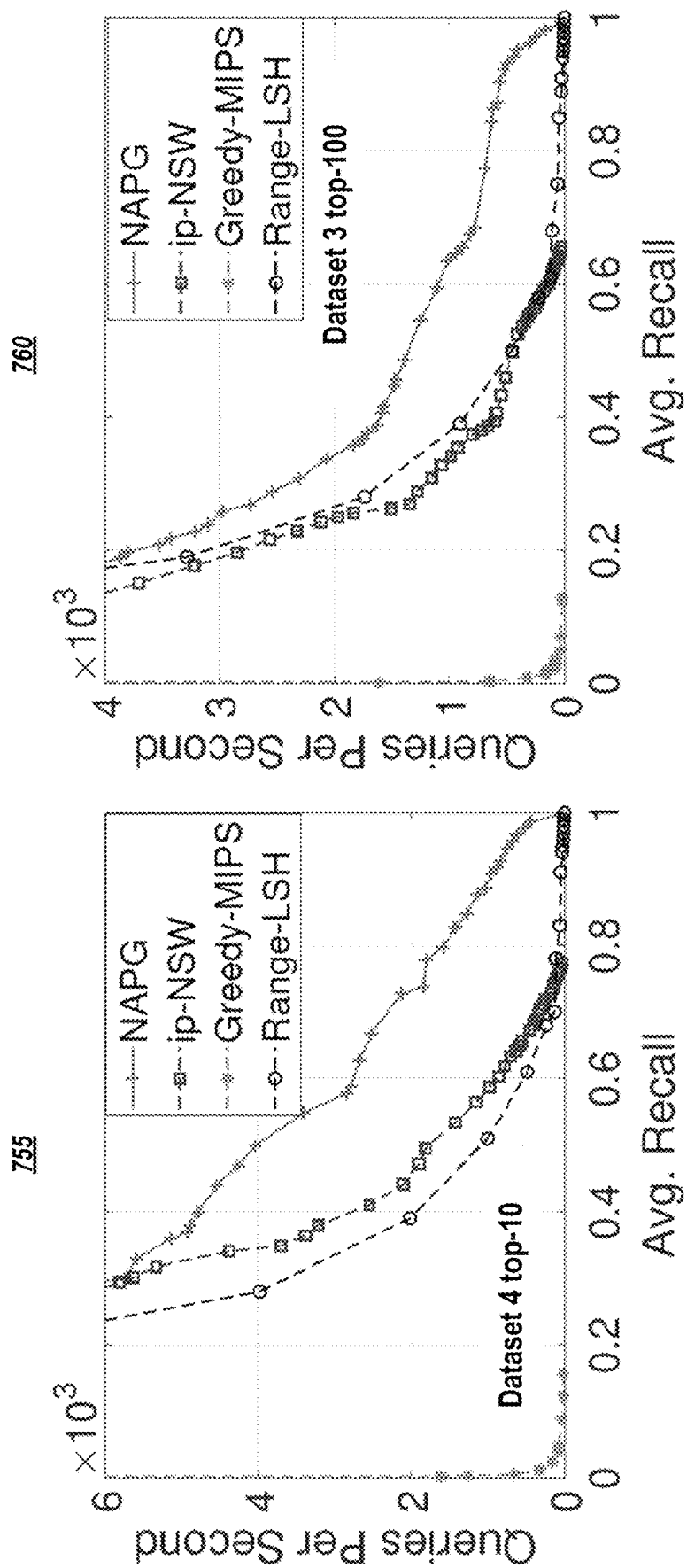

In one or more embodiments, the index graph G may be generated using steps as shown in FIG. 6. The index graph is initialized (605) by using an empty graph as shown in Methodology 4, Line 2. For each latent vector x in the latent vector set S, a greedy search is performed (610) to obtain k vertices {$p_i$} on the index graph G that have the top-k largest inner product values with x, where k is an integer larger than 1. A set of selected vertices C for the latent vector x is initialized (615), e.g., with an empty set. An estimated adjusting factor $\alpha_r$ is obtained (620) based on the sub-range that the latent vector x belongs to, as shown in Methodology 4, Line 5. The set of selected vertices C is updated (625) by adding one or more selected vertices, among the k vertices, that have a norm-adjusted inner product between each added vertex and the latent vector x no less than inner products between vertices in the set of selected vertices C. The index graph G is updated (630) by adding one or more edges that connect the latent vector x and the one or more selected vertices. Once the number of vertices in the set of selected vertices C reaches a predetermined threshold (M), updating for the index graph G at the latent vector x is stopped, the NAPG process iterates to another latent vector in the latent vector set S to proceed.

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Datasets

Embodiments of the NAPG methodology were evaluated for MIPS on vector datasets from various sources. Firstly, different methods were evaluated in fast item retrieval for online Recommender Systems. Two recommendation datasets were used: Dataset 1 and Dataset 2. For Dataset 1, no filtering was performed, but Dataset 2 was filtered to keep users with at least 30 interactions. The item amounts in these two datasets are much bigger than those in other recommendation datasets, which are more appropriate for exploring item retrieving efficiency.

As shown in Table 1, four different vector datasets were generated from Dataset 1 and Dataset 2, which are named Dataset 1 Matrix Factorization (MF), Dataset 1 Deep Matrix Factorization (DMF), Dataset 2 MF, and Dataset 2 DMF. In the following, we explain the details on how these four datasets in Table 1 were generated, based on MF and DMF.

MF is the most representative framework for collaborative filtering, which was implemented to generate the vectors for users and items. Furthermore, DMF was applied to generate alternative vector datasets. It shall be noted that herein the matching function is set as inner product instead of cosine similarity, and the loss function is set as the squared loss: $L_{sq} = \Sigma_{(i,j) \in Y^+ \cup Y^-} (Y_{ij} - \hat{Y}_{ij})$, where $\hat{Y}$ is the predicted rating score and Y is the real score. $Y^+$ is the positive training data, and $Y^-$ is the sampled negative data. The number of network layers is 2.

For these four datasets, the length for all vectors was set as 64. It shall be noted that vectors produced by MF and DMF are quite different. Vectors produced by MF are dense and contain both positive and negative real numbers. While vectors from DMF are sparse and only contain non-negative numbers because of the RELU active function.

In addition to those four datasets, Table 1 also includes two larger vector datasets from other domains: Dataset 3 and Dataset 4. Different from recommendation datasets, which require a method to produce latent vectors for users and items, original vectors of these two datasets were used. 1000 additional vectors were randomly sampled as queries (corresponding to those user vectors). Statistics of all datasets are listed in TABLE 1, below. As can be seen, the experimental datasets vary in dimension, sources, and extraction methods, which is sufficient for a fair comparison.

TABLE 1

Dataset Statistics

| Datasets | # Index Vec | # Queries | # Dim |
|---|---|---|---|
| Dataset 1 MF | 25815 | 25677 | 64 |
| Dataset 1 DMF | 25815 | 25677 | 64 |
| Dataset 2 MF | 104708 | 7748 | 64 |
| Dataset 2 DMF | 104708 | 7748 | 64 |
| Dataset 3 | 580012 | 1000 | 54 |
| Dataset 4 | 1000000 | 1000 | 784 |

To produce evaluation labels, item/base vectors for each user/query vector were ranked by brute force scanning (in inner product). Top-k items are considered as labels (k=10 and 100).

2. Baselines

As baselines, some representative previous state-of-the-art MIPS methods were chosen to evaluate in comparison with embodiments of the present patent document.

Greedy-MIPS is a state-of-the-art MIPS algorithm.

ip-NSW is also a MIPS method. Similar to the tested embodiment, ip-NSW is also a graph-based method.

Range-LSH is a hash-based method. Range-LSH outperforms previous hash-based methods for MIPS. So, comparisons were made as a representative of this line. It shall be noted that H2-ALSH (an asymmetric locality-sensitive hashing scheme based on homocentric hypersphere partition) also utilizes the data partitioning method (and the query transformation). It was shown in original H2-ALSH experimental results that H2-ALSH works well mainly because of the partitioning method but not the query transformation. So, Range-LSH and H2-ALSH are similar methods. Range-LSH was selected as a baseline since its implementation is public access.

3. Experimental Settings

All comparing methods had tunable parameters. The tested NAPG embodiment and ip-NSW had three common parameters: M, $k_{construction}$, and $k_{search}$, which control the degree of each node and the number of search attempts. The tested NAPG embodiment also had a unique parameter for the number of norm ranges, N. Greedy-MIPS had a key parameter budget and Range-LSH had two parameters: code length and the number of sub-datasets. To obtain a fair comparison, all parameters were varied over a fine grid for all methods.

There are two popular ways to evaluate ANNS/MIPS methods: (a) Recall vs. Time; and (b) Recall vs. Computations. They both evaluate the searching trade-off between efficiency and effectiveness. Recall vs. Time reports the number of queries a method can process per second at each recall level. Recall vs. Computations reports the amount or percentage of pairwise distance/similarity computations that the search method costs at each recall level. For a comprehensive evaluation, both of these perspectives are shown in the following experiments.

4. Recall vs. Time Results

Comparison results via Recall vs. Time are first represented in FIGS. 7A-F. All methods may be evaluated by this view. Each row is for each dataset from Dataset 1 MF, Dataset 1 DMF, Dataset 2 MF, Dataset 2 DMF, Dataset 3, and Dataset 4. The two columns are results for top-10 and top-100 labels. As shown in FIGS. 7A-F, the tested NAPG embodiment works best in most of the cases, especially in higher recall levels, which are more meaningful in real applications. Besides, the NAPG embodiment works insistently well on different sizes of labels. Different datasets have extremely different vectors, while the NAPG embodiment has superiority on all these kinds of vector data. These comparisons prove NAPG embodiments' efficiency and robustness.

Conversely, no baselines work insistently well on different sizes of labels. For example, ip-NSW and Greedy-MIPS become worse and worse from top-10 to top-100. Compared with ip-NSW, the NAPG embodiment improves the edge selection method by flexibly adjusting data points' norm. It is clear that, on these datasets, the tested NAPG embodiment provides much better performance than ip-NSW, especially on top-100 labels. ip-NSW works badly on top-100 labels since it filters out too many meaningful neighbors in edge selection and that hurts the performance heavily. Hash-based method Range-LSH performs badly in this view, compared with other methods. As can be seen, its performance is not comparable to others. Beyond recommendation datasets, it should be noted that the NAPG embodiment works consistently well on the two larger datasets, Dataset 3 and Dataset 4. The close baseline ip-NSW works inferiorly. Especially for the case of Dataset 3 top-100, ip-NSW can only get recalls around 40%.

5. Recall vs. Computations Results

Figure 8:
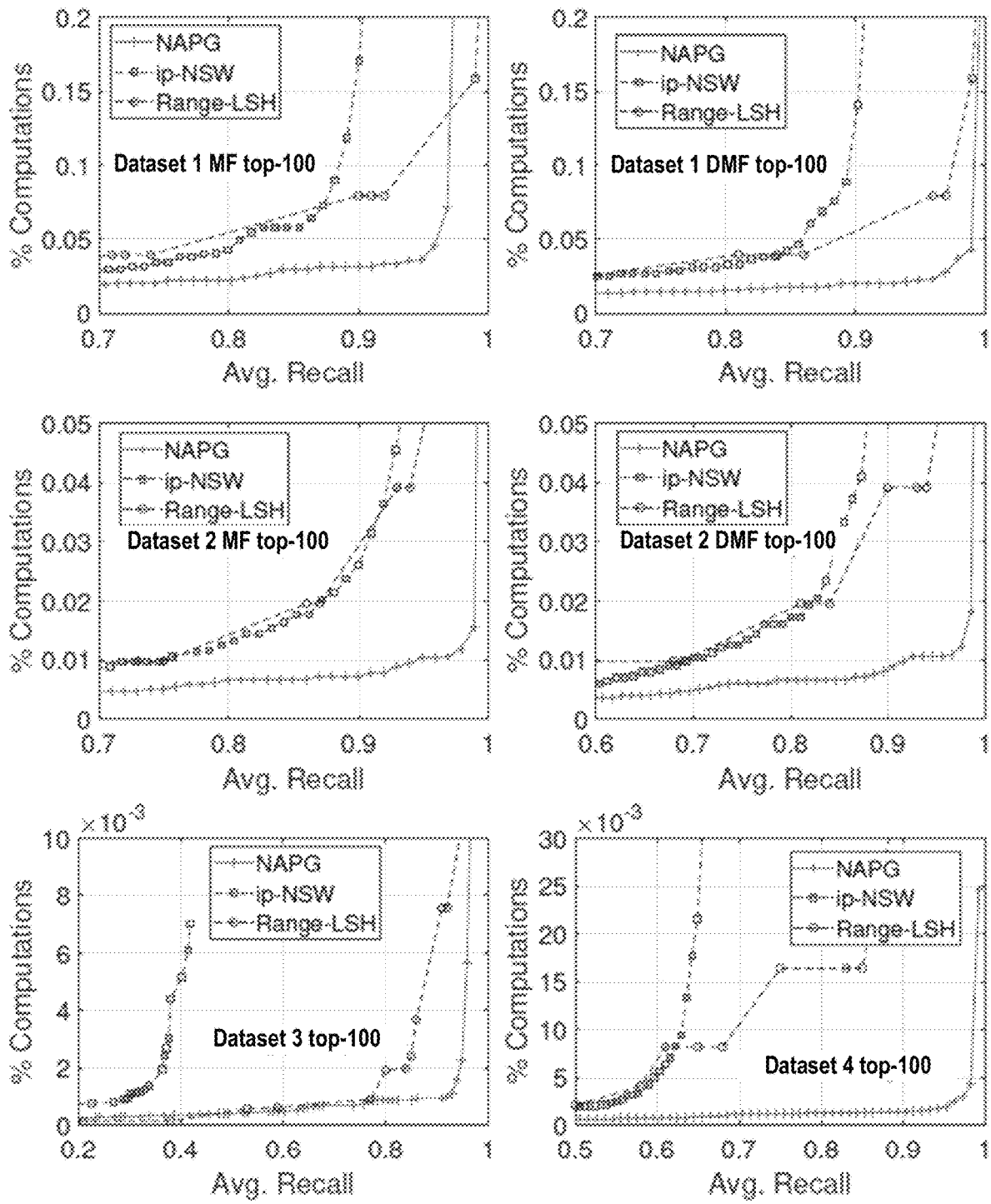
FIG. 8 graphically depicts comparisons via Recall vs. Computations results for top-100 labels, according to embodiments of the present disclosure.

The corresponding comparison results via Recall vs. Computations are shown in FIG. 8. From this point of view, Greedy-MIPS cannot be evaluated. So, results for the other three methods are presented. Results for top-100 labels are reported only in FIG. 8. Similarly, the NAPG embodiment provides better results compared to baselines (in most of the cases). Quantitatively, to get high recall levels, the tested NAPG embodiment requests a small partition of pair-wise computations. For example, on the Dataset 2 MF dataset and for top-100 labels, to achieve 95% recall, the NAPG embodiment only requests 1% computations. While for baselines, it is even difficult to achieve 95% recall.

Unexpectedly, Range-LSH works comparably with others in the Recall vs. Computations view. As explained in Section E.3, Recall vs. Computations does not consider the cost of different index structures. Although Range-LSH works well in this view, its overall time cost is much higher than others as shown in Section E.4. A possible reason is that the table-based index used in Range-LSH is not that efficient in searching. It is clear that graph-based index structures have significant superiority in searching efficiency.

6. Parameter Analysis

Figure 9:
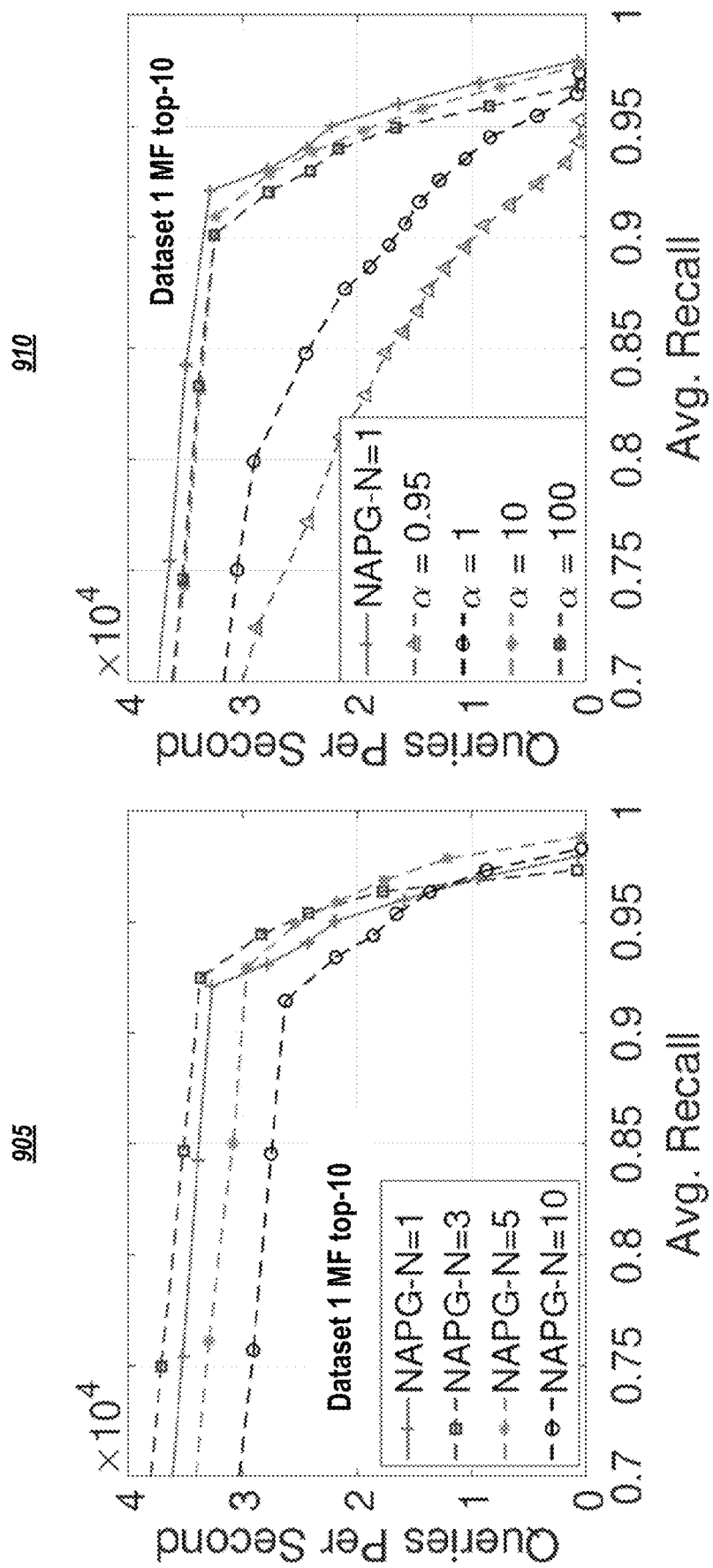
FIG. 9 depicts parameter analysis (chart 905) for the number of norm ranges N in an NAPG embodiment and a study (chart 910) of factor $\alpha$ estimation, according to embodiments of the present disclosure.

In this section, the key parameter N of the NAPG embodiment, the number of norm ranges, is analyzed. In one or more embodiments, N is a data-dependent parameter, dependent on the dataset's size and norm distribution. In the experiments above, N is considered as a tunable parameter together with other parameters. Here, to analyze N, M and $k_{construction}$ were fixed as 16 and 100, respectively. Results on Dataset 1 MF (top-10) are shown in FIG. 9, chart 905. As can be seen, the best N for this dataset is around 3 or 5, which is much better than a single norm range. If the dataset was split into even more ranges than this optimal solution, such as 10, it may hurt the performance too. This is because more ranges may lead to some ranges with extremely small norm data and then extremely large adjusting factors may be produced. Excessive more ranges may over-adjust data and construct too many useless edges.

7. Estimated Factor Study

The adjusting factor $\alpha$ is important for the tested NAPG embodiment. A flexible factor estimation method was designed based on sample data (Section D). Another way is setting $\alpha$ as a tunable parameter (for all index data or for each norm range). In this section, the factor estimation method was evaluated empirically. The results are shown in FIG. 9, chart 910. Only results for Dataset MF on the top-10 are shown. In the shown example, the case of norm range number N=1 for NAPG vs. tuning $\alpha$ as 0.95, 1, 10, 100 was also studied. The estimated $\alpha$ of NAPG is 4.33. It shall be noted that $\alpha=1$ is the solution of ip-NSW. If $\alpha$ is extremely large, such as 100, the inequality in Methodology 1, Line 9 may be always false, and the edge selection may become invalid. As can be seen, the NAPG embodiment learns a good estimation of $\alpha$. It brings almost the best performance among all choices. In one or more embodiments, one tunable parameter less will ease application without performance loss. For multiple norm ranges, N>1, the advantage may be more apparent.

F. Some Conclusions

Fast inner product search is an important task for several services, such as online recommender systems and retrieval-based Question Answering. In literature, this task is often referred to as approximate Maximum Inner Product Search (MIPS) problem. While solving MIPS exactly may be prohibitively expensive, or even infeasible, in industrial practice, developing approximate MIPS algorithms may also be challenging, because the inner product is a non-metric measure, which makes MIPS as a distinguishing problem from traditional ANN search problems (which typically deal with metric measures such as the cosine similarity). In this patent document, embodiments of a new graph-based searching methodology, which may be referred to as Norm Adjusted Proximity Graph (NAPG), for approximate MIPS. In constructing a proper index graph for inner product, an NAPG embodiment adjusts the norms of data points when inserting them into the graph. Embodiments of a flexible adjusting factor estimation methodology and a norm range-based improvement are also introduced, which make embodiments more flexible and robust. Empirical evaluations on a range of datasets demonstrate that tested NAPG embodiments are indeed effective and efficient, compared to common baselines.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 10:
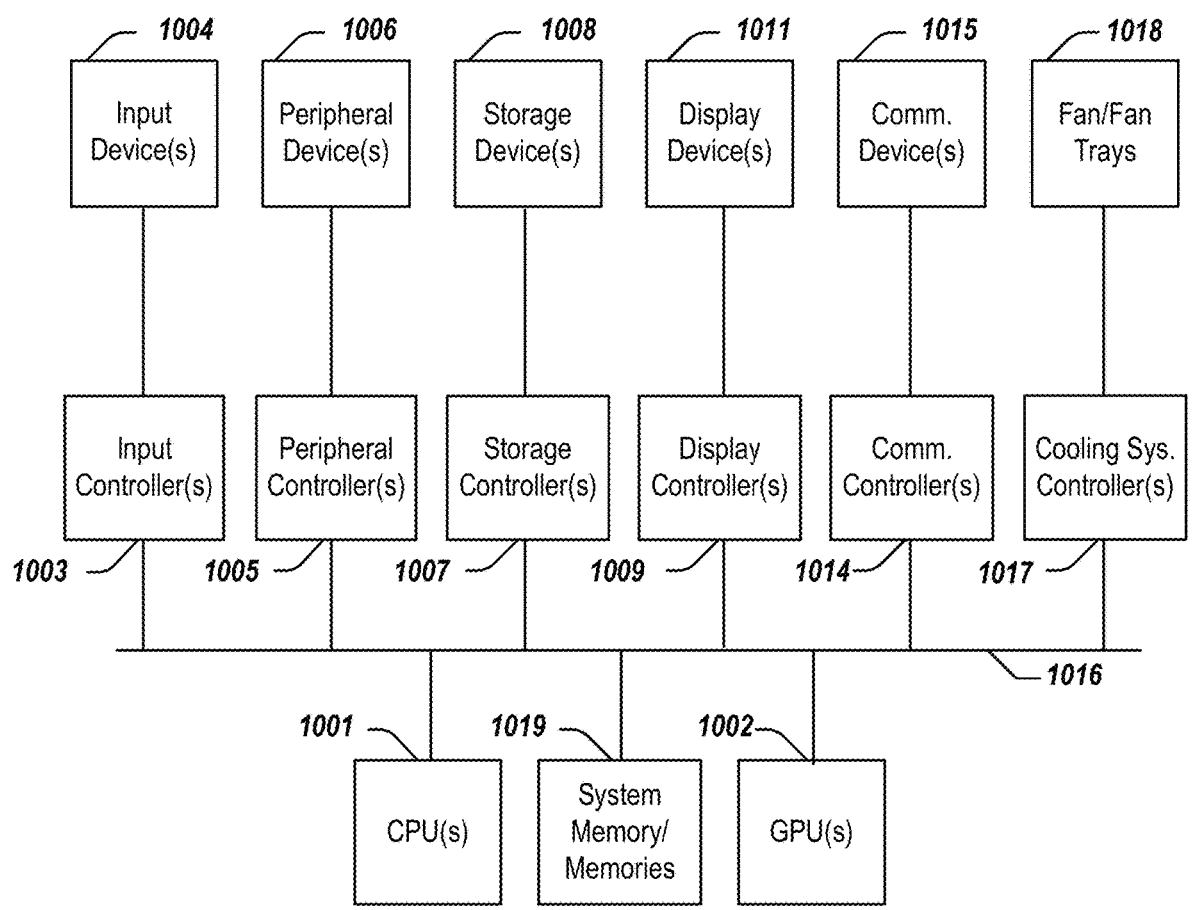
FIG. 10 illustrates a simplified block diagram of a computing device/information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provide computing resources and control the computer. CPU 1001 may be implemented with a microprocessor or the like, and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. The system 1000 may also include a system memory 1019, which may comprise RAM, ROM, or both.

A number of controllers and peripheral devices may also be provided, as shown in FIG. 10. An input controller 1003 represents an interface to various input device(s) 1004. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
given a vector set comprising multiple vectors:
obtaining a norm range map for the vector set comprising a plurality of sub-ranges;
obtaining an estimated adjusting factor for each sub-range by performing steps comprising:
selecting a set of samples from the sub-range;
for each sample from the set of samples from the sub-range, retrieving top-n vectors from the vector set that have a largest inner product value or values with the sample, wherein n is an integer greater than or equal to 1;
determining a first average of inner product values, in which the inner product values comprise, for each sample in the set of samples, the inner product values between the sample and each of its corresponding retrieved top-n vectors;
determining a second average of inner product values using inner product values obtained from among the retrieved top-n vectors for a sample from the set of samples; and
obtaining the estimated adjusting factor for the sub-range using a division of the second average by the first average;
constructing an index graph using norm-adjusted inner products, in which a norm-adjusted inner product is obtained by adjusting an inner product using one of the estimated adjusting factors; and
given a query vector, performing a search on the constructed index graph to retrieve one or more relevant vectors.

2. The computer-implemented method of claim 1 wherein the multiple sub-ranges are obtained using steps comprising:
obtaining a global norm range in terms of $l_2$-norm values for the vector set;
splitting the global norm range evenly into the multiple sub-ranges; and
drawing samples from the vector set using stratification sampling such that each sub-range obtains a same number or within a threshold of the same number of samples.

3. The computer-implemented method of claim 1 wherein the search is a greedy search.

4. The computer-implemented method of claim 1 wherein constructing the index graph using norm-adjusted inner products comprising steps of:
initializing the index graph; and
for each vector in the vector set,
performing a greedy search to obtain k vertices on the index graph that have the top-k largest inner product values with the vector, wherein k is an integer number larger than 1;
initializing a set of selected vertices for the vector;
obtaining an estimated adjusting factor based on the sub-range that the vector belongs to;
updating the set of selected vertices by adding one or more selected vertices, among the k vertices, that have a norm-adjusted inner product between each added vertex and the vector no less than inner products between vertices in the set of selected vertices; and
updating the index graph by adding one or more edges that connect the vector and the one or more selected vertices until the number of vertices in the set of selected vertices reaches a predetermined threshold.

5. The computer-implemented method of claim 4 wherein the index graph is initialized with an empty graph.

6. The computer-implemented method of claim 4 wherein the norm-adjusted inner product between each added vertex and the vector is a product between the estimated adjusting factor and an inner product between each added vertex and the vector.

7. The computer-implemented method of claim 1 wherein the retrieved one or more relevant vectors are ranked in terms of inner products between each relevant vector and the query vector.

8. A system comprising:
one or more processors; and
a non-transitory computer-readable medium or media comprising one or more sets of instructions which, when executed by at least one of the one or more processors, causes steps to be performed comprising:
given a vector set comprising multiple vectors:
obtaining a norm range map for the vector set comprising a plurality of sub-ranges;
obtaining an estimated adjusting factor for each sub-range by performing steps comprising:
selecting a set of samples from the sub-range;
for each sample from the set of samples from the sub-range, retrieving top-n vectors from the vector set that have a largest inner product value or values with the sample, wherein n is an integer greater than or equal to 1;
determining a first average of inner product values, in which the inner product values comprise, for each sample in the set of samples, the inner product values between the sample and each of its corresponding retrieved top-n vectors;
determining a second average of inner product values using inner product values obtained from among the retrieved top-n vectors for a sample from the set of samples; and
obtaining the estimated adjusting factor for the sub-range using a division of the second average by the first average;
constructing an index graph using norm-adjusted inner products, in which a norm-adjusted inner product is obtained by adjusting an inner product using one of the estimated adjusting factors; and
given a query vector, performing a search on the constructed index graph to retrieve one or more relevant vectors.

9. The system of claim 8 wherein obtaining the multiple sub-ranges comprises steps of:
obtaining a global norm range in terms of $l_2$-norm values for the vector set;
splitting the global norm range evenly into the multiple sub-ranges; and
drawing samples from the vector set using stratification sampling such that each sub-range obtains a same number or within a threshold of the same number of samples.

10. The system of claim 8 wherein n is an integer number larger than 1.

11. The system of claim 8 wherein constructing the index graph using norm-adjusted inner products comprising steps of:
   initializing the index graph; and
   for each vector in the vector set,
      performing a greedy search to obtain k vertices on the index graph that have the top-k largest inner product values with the vector, wherein k is an integer number larger than 1;
      initializing a set of selected vertices for the vector;
      obtaining an estimated adjusting factor based on the sub-range that the vector belongs to;
      updating the set of selected vertices by adding one or more selected vertices, among the k vertices, that have a norm-adjusted inner product between each added vertex and the vector no less than inner products between vertices in the set of selected vertices; and
      updating the index graph by adding one or more edges that connect the vector and the one or more selected vertices until the number of vertices in the set of selected vertices C reaches a predetermined threshold.

12. The system of claim 11 wherein the index graph is initialized with an empty graph.

13. The system of claim 11 wherein the norm-adjusted inner product between each added vertex and the vector is a product between the estimated adjusting factor and an inner product between each added vertex and the vector.

14. The system of claim 8 wherein the retrieved one or more relevant vectors are ranked in terms of inner products between each relevant vector and the query vector.

15. A non-transitory computer-readable medium or media comprising one or more sequences of instructions which, when executed by at least one processor, causes steps to be performed comprising:
   given a vector set comprising multiple vectors:
      obtaining a norm range map for the vector set comprising a plurality of sub-ranges;
      obtaining an estimated adjusting factor for each sub-range by performing steps comprising:
         selecting a set of samples from the sub-range;
         for each sample from the set of samples from the sub-range, retrieving top-n vectors from the vector set that have a largest inner product value or values with the sample, wherein n is an integer greater than or equal to 1;
         determining a first average of inner product values, in which the inner product values comprise, for each sample in the set of samples, the inner product values between the sample and each of its corresponding retrieved top-n vectors;
         determining a second average of inner product values using inner product values obtained from among the retrieved top-n vectors for a sample from the set of samples; and
         obtaining the estimated adjusting factor for the sub-range using a division of the second average by the first average;
      constructing an index graph using norm-adjusted inner products, in which a norm-adjusted inner product is obtained by adjusting an inner product using one of the estimated adjusting factors; and
      given a query vector, performing a search on the constructed index graph to retrieve one or more relevant vectors.

16. The non-transitory computer-readable medium or media of claim 15 wherein the multiple sub-ranges are obtained using steps comprising:
   obtaining a global norm range in terms of $l_2$-norm values for the vector set;
   splitting the global norm range evenly into the multiple sub-ranges; and
   drawing samples from the vector set using stratification sampling such that each sub-range obtains a same number or within a threshold of the same number of samples.

17. The non-transitory computer-readable medium or media of claim 15 wherein n is an integer number larger than 1; and
   the search is a greedy search.

18. The non-transitory computer-readable medium or media of claim 15 wherein constructing the index graph using norm-adjusted inner products comprising steps of:
   initializing the index graph; and
   for each vector in the vector set,
      performing a greedy search to obtain k vertices on the index graph that have the top-k largest inner product values with the vector, wherein k is an integer number larger than 1;
      initializing a set of selected vertices for the vector;
      obtaining an estimated adjusting factor based on the sub-range that the vector belongs to;
      updating the set of selected vertices by adding one or more selected vertices, among the k vertices, that have a norm-adjusted inner product between each added vertex and the vector no less than inner products between vertices in the set of selected vertices; and
      updating the index graph by adding one or more edges that connect the vector and the one or more selected vertices until the number of vertices in the set of selected vertices C reaches a predetermined threshold.

19. The non-transitory computer-readable medium or media of claim 18 wherein the norm-adjusted inner product between each added vertex and the vector is a product between the estimated adjusting factor and an inner product between each added vertex and the vector.

20. The non-transitory computer-readable medium or media of claim 15 wherein the retrieved one or more relevant vectors are ranked in terms of inner products between each relevant vector and the query vector.

* * * * *